(12) United States Patent
Nishida et al.

(10) Patent No.: US 6,301,454 B1
(45) Date of Patent: Oct. 9, 2001

(54) FIXING HEATER CONTROLLING METHOD AND AN IMAGE FORMING DEVICE

(75) Inventors: Yoshiaki Nishida; Yasuhiro Suzuki, both of Tokyo (JP)

(73) Assignee: Copyer Co., Ltd., Tokyo (JP)

( * ) Notice: Subject to any disclaimer, the term of this patent is extended or adjusted under 35 U.S.C. 154(b) by 0 days.

(21) Appl. No.: 09/508,876

(22) PCT Filed: Sep. 18, 1998

(86) PCT No.: PCT/JP98/04202

§ 371 Date: Mar. 14, 2000

§ 102(e) Date: Mar. 14, 2000

(87) PCT Pub. No.: WO99/14639

PCT Pub. Date: Mar. 25, 1999

(30) Foreign Application Priority Data

Sep. 18, 1997 (JP) .................................................. 9-272107
Nov. 26, 1997 (JP) .................................................. 9-340741

(51) Int. Cl.⁷ ................................................... G03G 15/20
(52) U.S. Cl. ........................... 399/69; 219/216; 399/334
(58) Field of Search .............................. 399/69, 70, 330, 399/334; 219/216, 483, 485

(56) References Cited

U.S. PATENT DOCUMENTS

| | | | |
|---|---|---|---|
| 3,937,921 | * 2/1976 | Furuichi et al. | 219/494 |
| 4,825,242 | * 4/1989 | Elter | 399/67 |
| 5,367,369 | * 11/1994 | Nakai et al. | 399/69 |
| 5,669,038 | 9/1997 | Kishimoto | 399/67 |
| 5,747,774 | * 5/1998 | Suzuki et al. | 219/216 |
| 5,907,743 | * 5/1999 | Takahashi | 399/69 |
| 5,966,562 | * 10/1999 | Maehara | 399/69 |
| 5,994,671 | * 11/1999 | Suzuki et al. | 219/216 |
| 6,177,657 | * 1/2001 | Takata | 219/497 |

FOREIGN PATENT DOCUMENTS

| | | |
|---|---|---|
| 63-92979 | 4/1988 | (JP) . |
| 63-280281 | 11/1988 | (JP) . |
| 63-280283 | 11/1988 | (JP) . |
| 2-146074 | 6/1990 | (JP) . |
| 7-36234 | 2/1995 | (JP) . |
| 7-64437 | 3/1995 | (JP) . |
| 7-114294 | 5/1995 | (JP) . |
| 7-334031 | 12/1995 | (JP) . |
| 9-80961 | 3/1997 | (JP) . |
| 9-197894 | 7/1997 | (JP) . |

* cited by examiner

Primary Examiner—Robert Beatty
(74) Attorney, Agent, or Firm—Dellett and Walters

(57) ABSTRACT

There are provided three periods of time immediately after an AC power-supply voltage is started to be applied to fixing heaters when the heater temperature falls below a target temperature: a first period for driving only a first heater; a second period for driving only a second heater following the first period; and a third period for driving the first and second heaters following the second period. During the first and second periods, the first and second heaters are thinning-controlled, respectively. At this time, at a cycle of 3 half-waves of the AC voltage applied to each fixing heater, a thinning frequency is changed from a large value to a smaller one. The third period includes first and second sub periods which are alternately repeated. In at least one of the first and second sub periods, the first and second heaters are thinning-controlled and the relation of the thinning controls of the two heaters is such that they are complementary to each other on the time axis.

16 Claims, 20 Drawing Sheets

F I G. 2
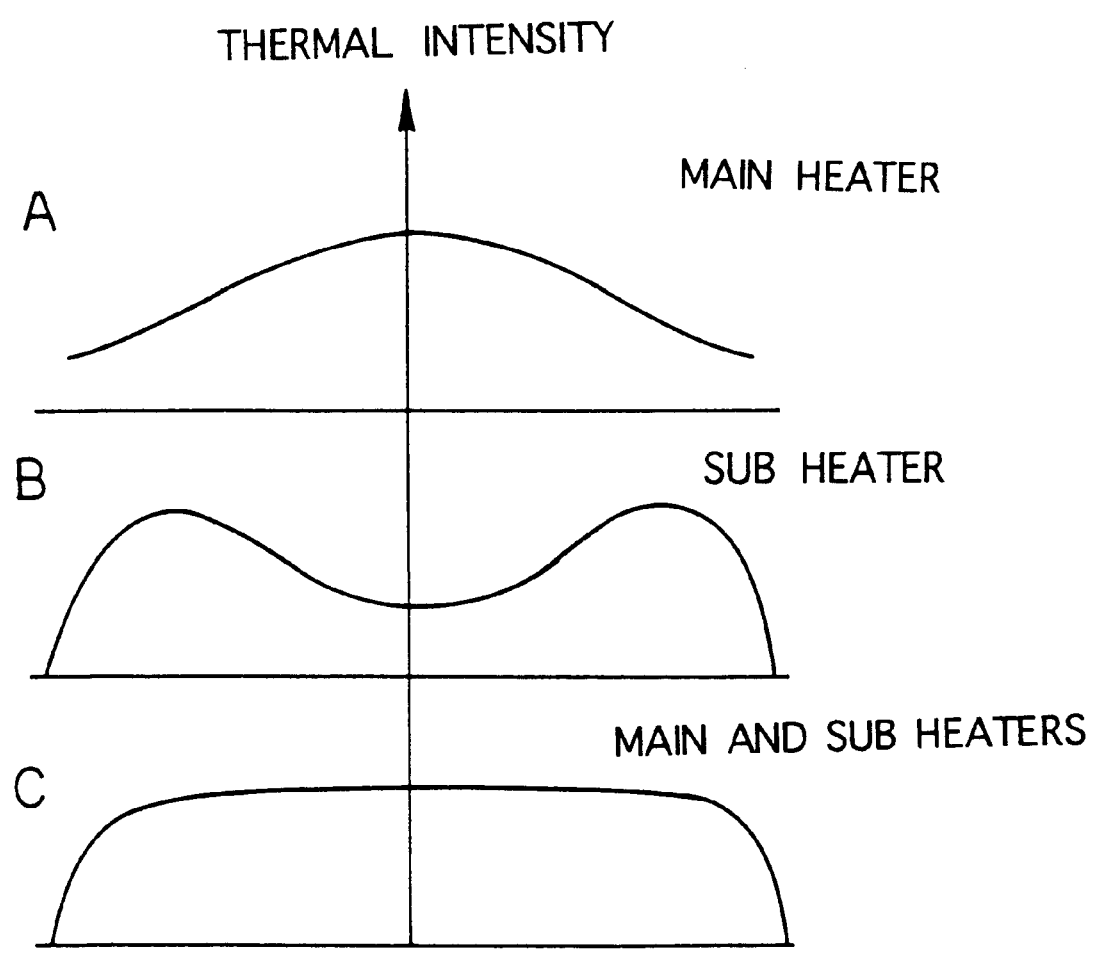

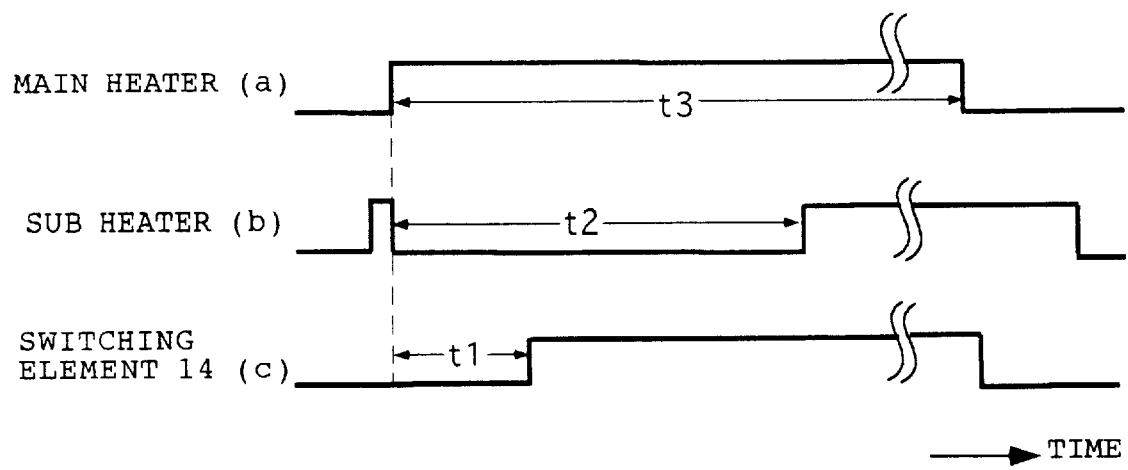
F I G. 1 7

FIXING HEATER CONTROLLING METHOD AND AN IMAGE FORMING DEVICE

TECHNICAL FIELD

The present invention generally relates to an image forming device such as an electro-static copying machine, printer, etc. and particularly to a heater controlling method which reduces electric-current fluctuation, including rush currents caused by ON/OFF control of a fixing heater which is used for thermally fixing a toner image formed on a recording medium such as a paper sheet or the like.

BACKGROUND ART

Such a prior art image forming device uses a fixing roller including a halogen heater therein as a heat source of a thermal fixing unit. The halogen heater has, as its characteristics, a temperature-dependent electric resistance. The halogen heater at a high temperature exhibits a high resistance whereas at a lower temperature it exhibits a lower resistance. This type of image forming device includes a temperature sensor provided near the fixing roller to monitor the temperature of its surface so as to control the heater such that it is turned on when the temperature becomes below a lower limit and turned off when the temperature becomes above an upper limit. For this reason, the heater resistance is low at the time when the heater changes from its OFF state to ON state, causing a great rush current to flow immediately after the turning-on thereof.

FIG. 5 shows a drawing for explaining how the voltage change occurs. In general, a power supply viewed from its outlet exhibits a relatively small source impedance (Rs) 27. This will cause a change in voltage when a current I consumed in a device (e.g. copying machine) connected to the power supply has changed suddenly. Letting the amount of the sudden change in current be $\Delta I$, a resulting abrupt change $\Delta V$ in voltage can be provided as follows:

$$\Delta V = R_s \times \Delta I$$

For example, when a light 9 is connected to the outlet the abrupt change in voltage would appear in the form of the flicker of the light.

Now, an explanation will be given of an object of the present invention with reference to a specific configuration of a fixing unit. FIG. 1 shows a general configuration of the fixing unit to which the present invention is applied, in which numeral 1 indicates a heater roller (fixing roller) and numeral 22 indicates a pinch roller. When a sheet 23 on which a toner image is formed is passed between the rollers 1 and 22, the toner image is melted and fixed on the sheet 23. The heater roller 1 includes therein a main heater 2 and a sub heater 3 in such a manner as illustrated in FIG. 1.

More specifically, as shown in FIG. 2 A, B and C, the main heater 2 has a peak in thermal intensity distribution approximately at the center thereof (see FIG. 2 A) whereas the sub heater 3 has peaks at its both ends (FIG. 2 B) in thermal intensity distribution. By alternately turning on the two heaters with their ON durations controlled, the temperature distribution on the roller surface is uniformed (FIG. 2 C).

FIG. 3 shows a waveform of a current which flows through the heaters at a standby state, in which P1 indicates a portion of an abrupt change. As stated above with reference to FIG. 5, this current change will cause a change in voltage of the power supply itself, resulting in disadvantages such as flickers of the light connected to the same power supply. In recent years, a social demand has increased to reduce the voltage change caused by the current change of such a device.

The present invention aims to reduce the abrupt current changes caused by the halogen heater that is used in the fixing unit of an image forming device—specifically the following abrupt current change portions as shown in FIG. 3.

1. the rush current portions (P1 and P2 in FIG. 3); and
2. the current changing portions due to the heater switching of a dual-heater fixing unit (P3 and P4 in FIG. 4).

An approach to solve these problems is to turn on and off the heaters according to the phase control as shown in FIG. 4. In order to reduce the abrupt voltage change as caused by the rush current immediately after a heater's turning-on, raising the effective voltage slowly is sufficient. For example, in the form of a conducting current waveform of the main heater 2 as shown in FIG. 4, the conducting time period within each half-wavelength is made greater from tm1 to tm2, to tm3, . . . and to tmc. Similarly, with respect to the sub heater 3, the conducting time period is changed from ts1 to ts2, to ts3, . . . , and to tsc. The time periods tmc corresponding to the conducting phase angle at a steady state of the main heater 2 are kept constant and the time periods tsc of the sub heater 3 are also kept constant.

Considering back the switching of the waveforms shown in FIG. 3, the consuming power of the main heater 2 is defined by the ratio of Tm/T and that of the sub heater 3 is defined by the ratio of Ts/T. Based on the values, it is possible to determine the values of tmc and tsc, respectively.

This approach, in fact, may allow approximately ideal slow change in current. However, this suffers from the following drawbacks:

1. Complicated hardware configuration is necessary for such timer mechanisms which manage the phase angles (i.e., above-mentioned time periods tmc, tsc, etc.). The complexity in controlling of the set-up and activation of the mechanisms would also be enhanced.

2. The areas of different Ac power frequency (50 Hz and 60 Hz) need individual set-ups, resulting in bothersome management of the frequency.

3. As seen from FIG. 4, the heaters are turned on not at the zero-crossing point but in the midst of a half-wave, causing harmonics to be generated. This harmonics current is generated at frequencies several or several 10 times as large as the electric power frequency, which will act as noises to other equipment connected via the power line, causing erroneous operations or failures. In a case of phase control, any countermeasure such as inserting a large choke coil is necessary.

Also, there are the following alternative approaches:

(a) A resistor for suppressing the rush current is inserted in the circuit in parallel with a heater. When a certain time has elapsed to allow the heater resistance to grow after its turning-on, the resistor is removed from the circuit. This type of prior art technique is disclosed in Japanese Laid-open (KOKAI) patent publication No. 9-16034.

(b) In order to prevent the heater resistance from being lowered, the heater is intermittently turned on to constantly warm up the heater even during the OFF period. This type of prior art technique is disclosed in Japanese Laid-open patent publication No. 59-57311.

However, these approaches have the following drawbacks.

The approach (a) requires, for an image forming device with a plurality of heaters, separate resistors for preventing the rush current with respect to each of the heaters. When the heater power is large, its cold resistance is relatively small, so that a resistor of a large resistance has to be inserted to suppress the rush current produced just after the heater's turning-on. The large resistance limits the current flow, which would require a considerable time till the heater is warmed. Therefore, the time period of placing the resistor in the circuit has to be set large. Otherwise, the rush current produced at the time of removing the resistor would become great. For this reason, the power consumption of the resistor increases, causing the excessive heating or breakdown of the resistor.

In the approach (b) where the heater is intermittently turned on and off to suppress the rush current down to a target level, the amount of flicker of an illuminating light may be reduced. However, the turning-on frequency of the heater increases, which will still be a problem in terms of total reduction in flickers. In addition, a large power heater would require frequent turning-on of the heater to reduce rush current down to the target level.

In addition, U.S. Pat. No. 5,669,038, which corresponds to Japanese Laid-open patent publication Nos. 9-16018 and 9-80961, teaches a technique to apply an AC intermittent pattern for a predetermined period of time immediately after the turning on or off of a heater. This makes it possible to suppress flickers or noises to occur without the phase control. However, the technique disclosed in U.S. Pat. No. 5,669,038 provides no consideration as to the application to a fixing unit which includes a plurality of heaters as the above stated main and sub heaters. Depending upon the way of applying the intermittent patterns to the heaters, the effective current change could even increase, halving the effect of reduction in flickers and noises.

In view of such problems, the present invention is to provide a method to overcome them. That is, the present invention provides a method of controlling fixing heaters, suited for a fixing unit with first and second heaters, for reducing abrupt current changes due to the fixing heaters without using the phase control, and an image forming device which employs the method.

Another object of the present invention is to provide an image forming device capable of suppressing the rush current by applying a rush-current preventing resistor of relatively small resistance only to one heater even in the case of employing a plurality of heaters.

DISCLOSURE OF INVENTION

A fixing heater control method according to the present invention comprises the steps of: employing, as a method of driving fixing heaters including first and second heaters, a control of thinning one or more of half-waves from among each cycle of at least consecutive three half-waves of applied AC power voltage; providing, immediately after the AC power voltage is started to be applied to the fixing heaters, a first period in which only the first heater is driven, a second time period following the first period in which only the second heater is driven, and a third period following the second period in which the first and second heaters are driven; the first and second heaters being thinning controlled in the first and second periods, respectively; the third period being divided into first and second sub periods which are alternately repeated, and in at least one of the first and second sub periods the first and second heaters being thinning-controlled and the relation of the thinning control of the two heaters being such that they are complementary to each other on the time axis.

With this arrangement, in a fixing unit with a plurality of heaters, it is possible not only to prevent the rush current for each heater from being created immediately after the application of the AC power voltage to the heaters but also to reduce the amount of average current change which occurs due to the switching between the two heaters. In addition, the heater current begins to flow at a zero-cross point without using the phase control, most of the power harmonics generated on the power line will be reduced with relatively simple control hardware configuration.

Preferably, in the first and second periods, the thinning control is performed such that plural cycles of half-waves are applied to each of the first and second heaters while the number of half-waves to be thinned is changed from a large value to a small one.

For example, in the first and second periods, the thinning control may be performed at a cycle of three half-waves so as to apply plural cycles of the three half-waves to each of the first and second heaters, with the number of half-waves thinned being "2". Further, in the first and second periods, after the application of the plural cycles of the three half-waves with the number of half-waves thinned being "2", another plural cycles of the three half-waves may be applied to each of the first and second heaters, with the number of half-waves thinned being "1".

In the third period, preferably at a cycle of consecutive three half-waves, the first heater is driven by thinning one or two half-waves from the three half-waves of one cycle, while the second heater is driven only with the half-waves that are thinned with respect to the first heater. Further, in the third period, it may be preferred to alternately switch between such a first driving pattern applied to the first and second heaters and a second driving pattern in which the relation between the first and second heaters are reversed compared to the first driving pattern.

More specifically, the following control is performed at a cycle of three consecutive half-waves, which is substantially equal to the control in which Nm consecutive half-waves to the first heater and Ns consecutive half-waves to the second heater are alternately and repeatedly applied.

(a) in a case where 2Nm>Ns and 2Ns>Nm:
in the first sub period of the third period, the first and second heaters are driven by 2Ns–Nm half-waves with the first driving pattern in which two half-waves are thinned from a cycle of three half-waves for the first heater while the second heater is driven with the two half-waves that are thinned for the first heater; and
in the second sub period, the first and second heaters are driven by 2Nm–Ns half-waves with the second driving pattern in which one half-wave is thinned from a cycle of three half-waves for the first heater while the second heater is driven with the one half-wave that is thinned for the first heater.

(b) in a case where 2Nm≦Ns:
in the first sub period, the first and second heaters are driven by 3Nm half-waves with the first driving pattern; and
in the second sub period, instead of the second driving pattern, only the first heater is driven by Ns–2Nm half-waves with no half-waves thinned.

(c) in a case where 2Ns≦Nm:
in the first sub period, the first and second heaters are driven by 3Ns half-waves with the second driving pattern; and
in the second sub period, instead of the second driving pattern, only the second heater is driven by Nm–2Ns half-waves with no half-waves thinned.

As a device for implementing the above-stated method according to the present invention, there is provided an image forming device having a fixing unit for fixing a toner image on a sheet, comprising: first and second heaters as fixing heaters for the fixing unit; first and second switching means for independently controlling applications of AC power voltage to the first and second heaters; a temperature sensor means for detecting a heater temperature of the fixing heaters; a zero-cross detection means for detecting zero-cross points of the AC power voltage; and a control means for deciding based on a predetermined procedure, when the temperature detected by the temperature sensor means is lower than a predetermined value, whether or not the first or second heater is to be driven with a half-wave of the power voltage each time a zero-cross point is detected by the zero-cross detection means, and for controlling the first and second switching means on the basis of the decided result.

In this image forming device, the first and second heaters preferably have different distributions in thermal intensity.

There is provided another image forming device according to the present invention comprising a fixing roller including a first heater and a second heater of a power consumption lower than the first heater, first and second switching means for independently controlling the first and second heaters; a temperature sensor means for detecting a temperature of the fixing roller; and a control means for controlling the first and second switching means so as to drive the first and second heaters when the temperature of the fixing roller detected by the temperature sensor means is lower than a predetermined lower limit; the control means controlling the first and second switching means such that the second heater is first turned on and then immediately turned off, and that at the same time with the turning-off of the second heater the first heater is turned on, and then after a predetermined time elapsed the second heater is re-turned on.

Thus, the heater of a smaller power consumption is turned on for a short time before the turning-on of the heater of a greater power consumption, thereby substantially dispersing in time the amount of current change in order to reduce the same at a time. As a result, flickers of the light or the like and noises can be reduced.

The control means preferably controls the first and second switching means such that when the temperature of the fixing roller reaches a predetermined upper limit the first heater is first turned off, then, after a certain time, the second heater is turned off. This allows the amount of current change to be reduced also in the turning-off operation of the heaters.

After turning off both the first and second heaters when the temperature of the fixing roller has reached the predetermined upper limit, the control means preferably controls the first heater so as to be intermittently turned on and off at a predetermined cycle of time while the second heater is turned on and off such that the ON period of the second heater is provided adjacent to the ON period of the first heater at least immediately before the first heater's ON period.

With this arrangement, even after the temperature reaches the upper limit, the heater temperature is prevented from lowering to thereby prevent the resistance from lowering. As a result, the amount of the current change that will occur at the subsequent heater driving will be reduced. At this time, by turning on the second heater of a smaller power consumption for a short time immediately before the first heater's turning-on, the amount of current change at a time will be reduced, as mentioned above.

For the same reason, when the first heater is intermittently turned on and off at a predetermined cycle, the control means preferably may control the second heater such that the ON period of the second heater is provided not only immediately before the ON period of the first heater but also immediately after the same.

The image forming device may further comprise a rush current preventing means for reducing the magnitude of a rush current that occurs at the time of the first heater's turning-on, the control means normally enabling the rush current preventing means while disabling the same after the first heater is turned on when the fixing roller temperature has becomes lower than the predetermined lower limit, from a predetermined time prior to the second heater's re-turning-on at least till the first heater's turning-off.

More specifically, the rush current preventing means may include a resistor which is selectively connected in series with the first heater; and a third switching means for inserting/removing the resistor in series with the first heater. In this case, the control means controls the third switching means such that the resistor is normally inserted in series with the first heater and the resistor is removed after the first heater is turned on when the fixing roller temperature is lower than the predetermined lower limit, from a predetermined time prior to the second heater's re-turning-on at least till the first heater's turning-off. This can reduce the magnitude itself of the rush current of the first heater of a greater power consumption at the time of its turning-on.

Instead of the resistor, an existing element present inside the image forming device may be shared to thereby eliminate the need of the resistor as a dedicated element.

Also instead of the second heater, an optical lamp or an environmental heater may be shared as the second heater. Of course, the optical lamp or the environmental heater is not to generate heat for the fixing purpose but only to control the power current.

BRIEF DESCRIPTION OF DRAWINGS

FIG. 2 A, B and C are graphs which show thermal intensity distributions of main and sub heaters of the fixing unit shown in FIG. 1;

FIGS. 17(a) (b) and (c) are a timing chart showing heater control in the second embodiment of the invention;

BEST MODE FOR CARRYING OUT THE INVENTION

Preferred embodiments of the invention will now be described in detail. The general configuration of a fixing unit to which the present invention is applied is as described above with reference to FIG. 1 and FIGS. 2A, B and C. That is, two heaters, i.e., main heater 2 and sub heater 3, as the fixing heaters, are basically turned on and off alternately while adjusting the ON duration of each heater so as to uniform the temperature distribution on the surface of the heater roller.

Figure 3:
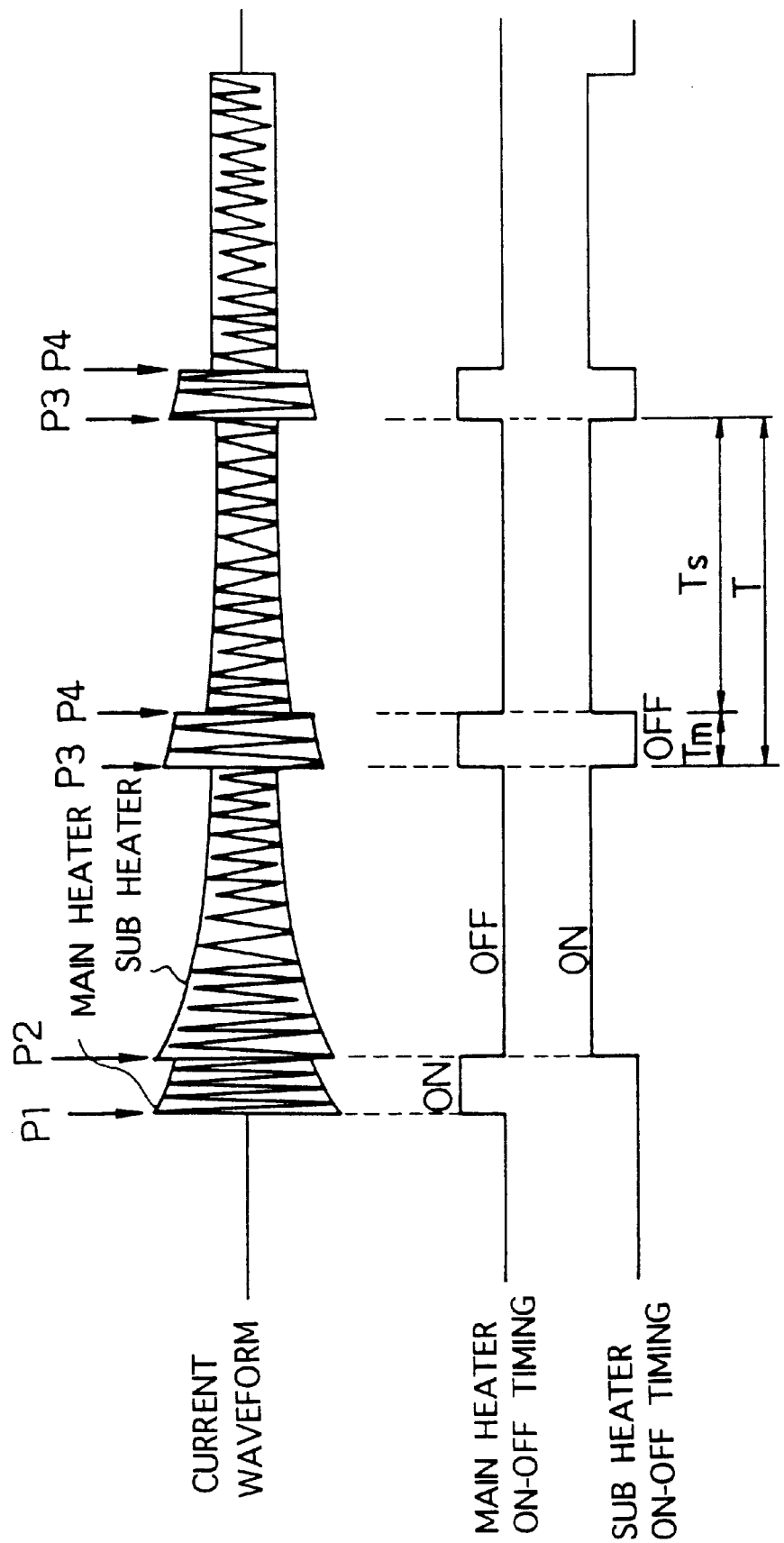
FIG. 3 is a timing chart showing an example of driving states of the main and sub heaters of the fixing unit shown in FIG. 1.
Figure 4:
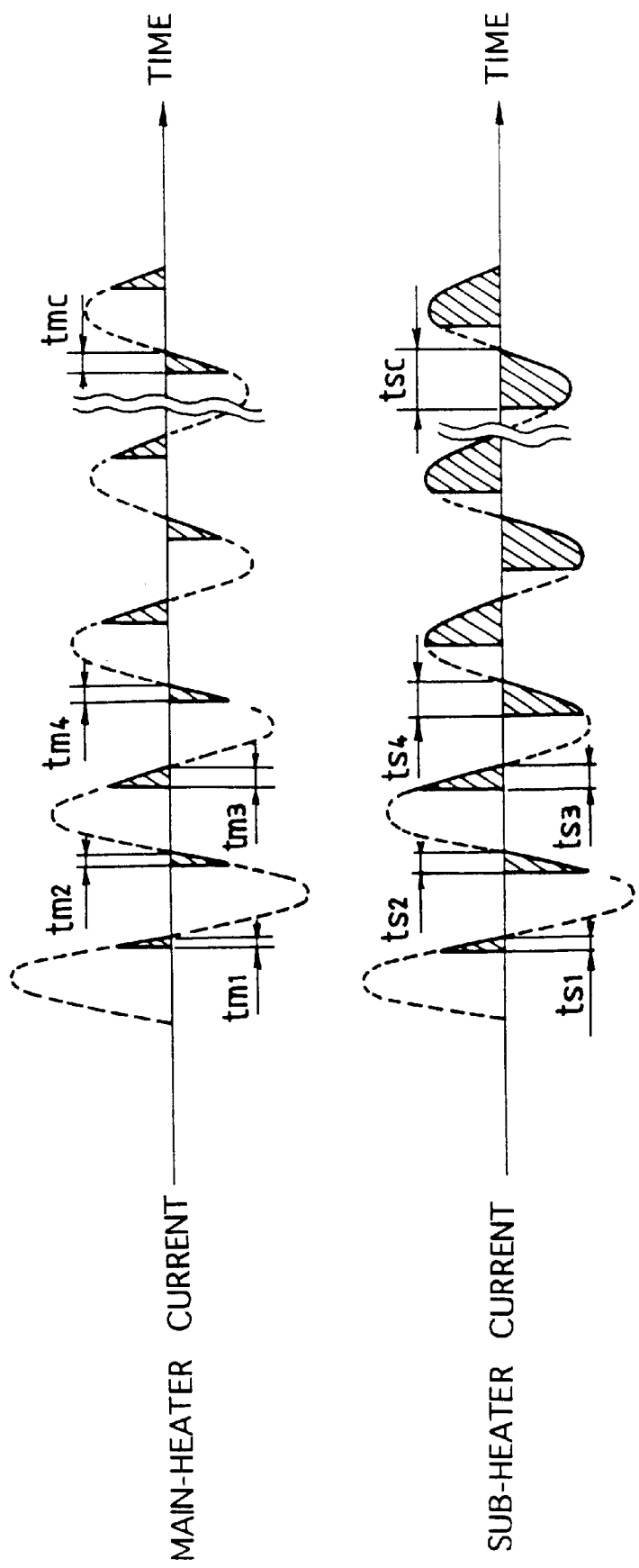
FIG. 4 is a timing chart for explaining the driving of the heaters according to the phase control.
Figure 5:
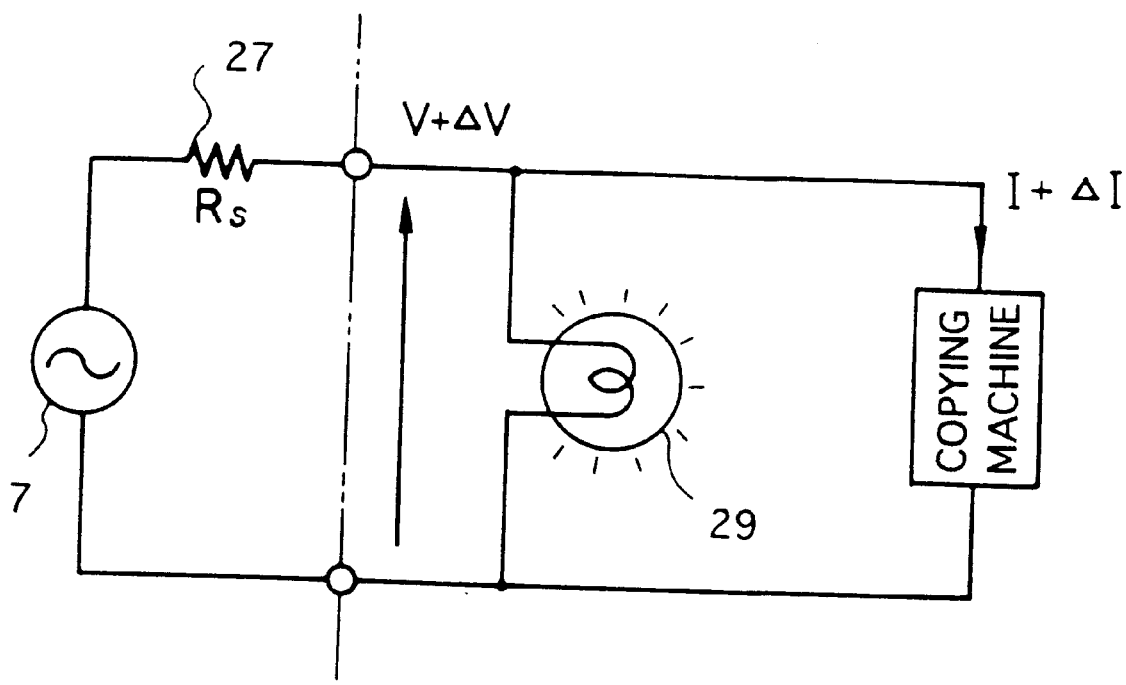
FIG. 5 is a circuit diagram for explaining the voltage fluctuation caused by the change in current of a device.

Referring to FIG. 3, the illustrated driving pattern of the two heaters is not the pattern provided by the present invention, but is used for explaining the meaning of employing the two heaters.

In a stand-by state in which no paper sheet is passed through the fixing unit, the two heaters are alternately turned on, as shown in FIG. 3, such that the ON duration of the main heater 2 is shorter than that of the sub heater 3. When a paper sheet is passed and the sheet is of a small size, then the latent heat around the center of the heater roller will be lost and, hence, the ON duration of the main heater 2 is made longer. Thus, the alternate turning ON durations are changed based on the operation mode such as stand-by or copy so that the thermal distribution on the heater roller is uniformed. Particularly for smaller sizes of sheet, the temperature at portions on the heater roller (e.g., near the both ends) that are not passed by the sheet, is prevented from excessively rising, thereby protecting bearings of the heater roller or driving gears from being damaged due to high temperature.

The present embodiment aims to provide the same result as such control for the two heaters while suppressing abrupt changes in average current.

Figure 6:
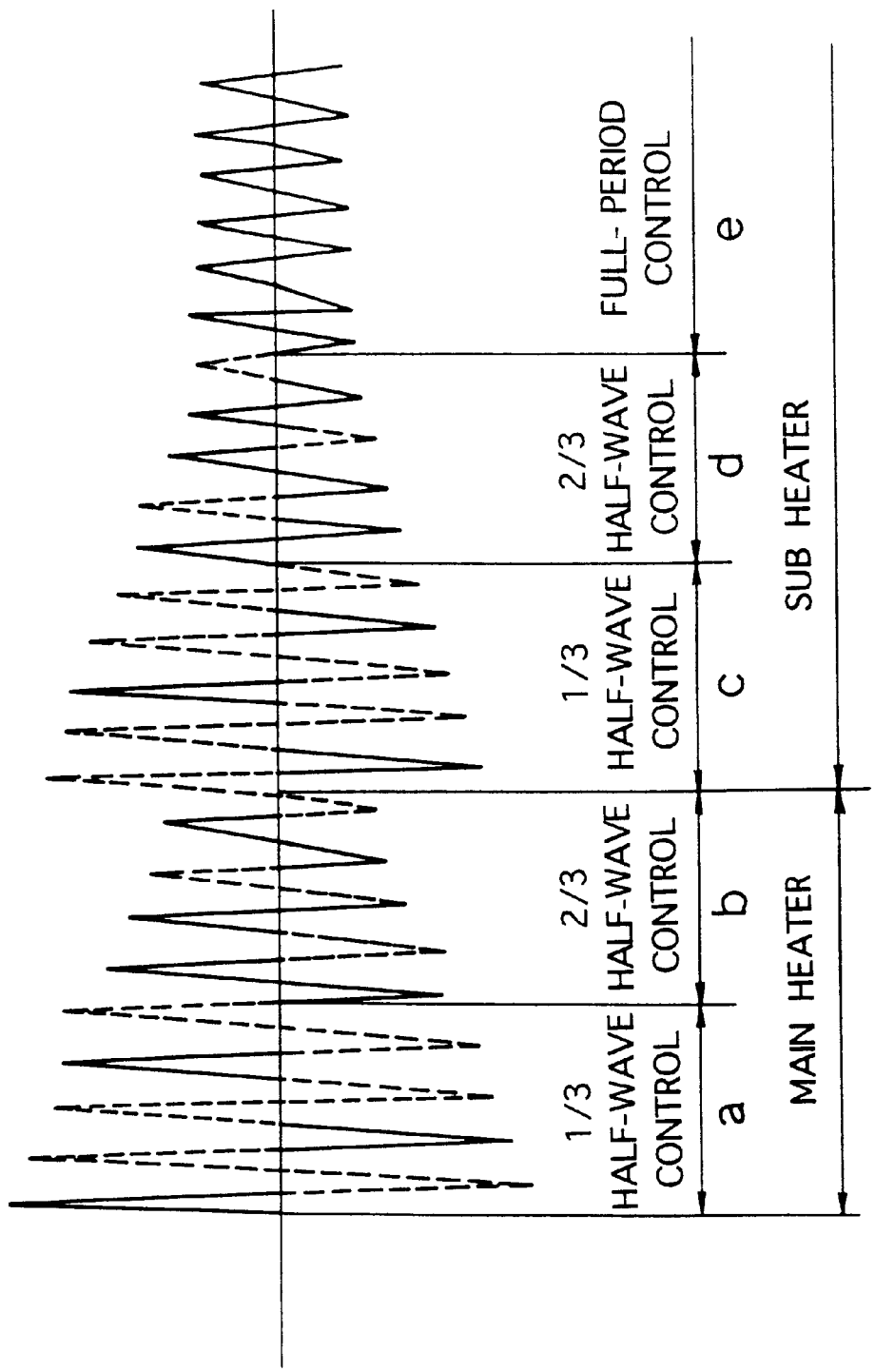
FIG. 6 shows current waveforms showing an example of the wave-number control at the time of starting the heaters in an embodiment of the invention.

FIG. 6 shows an example of a "wave number control" according to the present invention. This is applied to a rush current portions of the halogen heaters. A rush current portion resides at the rising portion immediately after the heater's turning-on and it is preferable to slowly increase the average current. To this end, in this embodiment, there are provided a first period of time in which only the main heater is driven and a second period of time, following the first period, in which only the sub heater is driven. The first period is divided into sub periods a and b, and the second period is also divided into sub periods c and d.

Firstly, in the sub period a in the first period, the main heater is cyclically driven by one half-wave out of three consecutive half-waves (this referred to as "⅓ half-wave control"). Then in the sub period b, the main heater is driven by two half-waves out of the three half-waves (this is referred to as "⅔ half-wave control"). Subsequently, the main heater may be driven by full half-waves for a necessary period of time (this is referred to as "full period control", not shown).

After this, in the second period, the main heater 2 is kept off and only the sub heater 3 is driven such that, similarly to the above, the sub period c of the "⅓ half-wave control" first comes, followed by the sub period d of the "⅔ half-wave control". This is further followed by a period e (third period) of the "full period control" in which no half-waves are thinned or omitted. It will be described below how each heater is specifically driven in the third period.

The control shown in FIG. 6 is summarized in that the average current, at the start of the heater driving, is switched stepwise (here in three steps) from lower to higher level so as to proceed finally to the "full period control". In other words, initially at the starting of the heater driving, two half-waves are omitted out of three half-waves (in the period a or c), and then after the heater is warmed up to a certain extent, which causes the rush current to lower, the control is switched to the one half-wave omitted out of the three half-waves (in the period b or d). Finally, the control is switched to control of the "full period control" with no half-waves omitted.

Now, an explanation is given of the reason why the wave number omission with a base cycle of three half-waves is preferable to employ. For example, considering the case where two half-waves (i.e., normally one cycle) is used as the base cycle, one half-wave omission from this cycle results in a DC component that is the same as in the case of half-wave rectification. This DC driving is not recommended for the halogen heater. For a longer base cycle than the three half-waves, the omission of half-waves becomes more perceptible to the human eye as flickers in terms of characteristics of the flicker of an illumination light. This leads to that the shortest cycle other than the two half-wave cycle, that is, the three-half-wave cycle is the most appropriate to employ. In fact, almost no flickers are perceptible when the three-half-wave cycle was tested to monitor the flickers of the illumination light connected to the power line.

However, the half-waves omission at cycles longer than the three-half-wave cycle is still effective as compared to the prior art, and hence, the present invention is not intended to exclude them, as described below.

Next, an explanation will be given of a method of reducing the current changes (P3 and P4 portions in FIG. 3) when switching between the two halogen heaters in the third period, from the main heater 2 to the sub heater 3 and vice versa.

The conventional cyclic switching between the two heaters were, as shown in FIG. 3, carried out from one to the other in a relatively greater period of time (several hundreds of milliseconds to several seconds). The idea of the invention is that this switching is made quickly to an extreme end.

Figure 7:
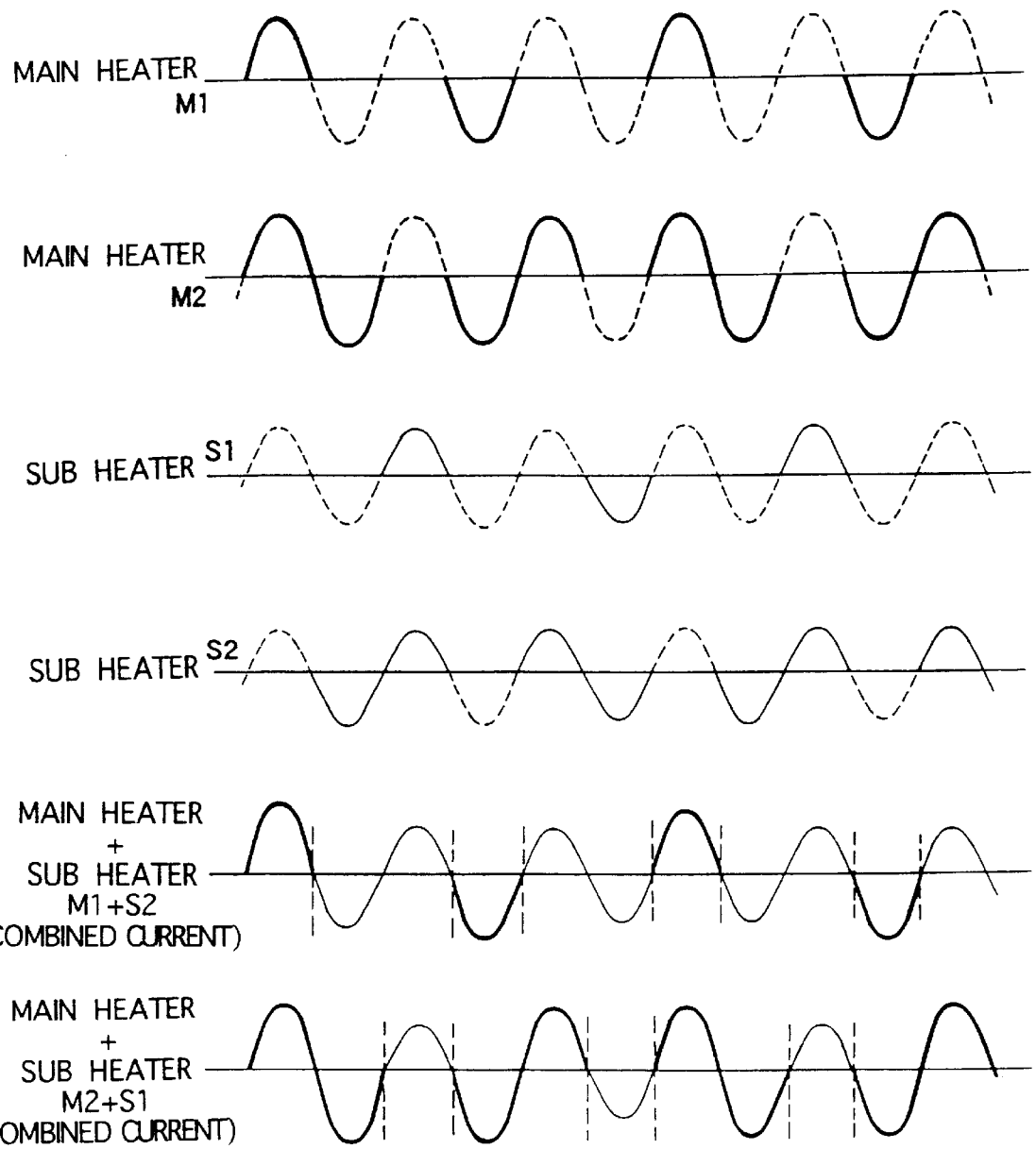
FIG. 7 shows current waveforms showing driving patterns which are used when the main and sub heaters are switched in the embodiment of the invention.
Figure 8:
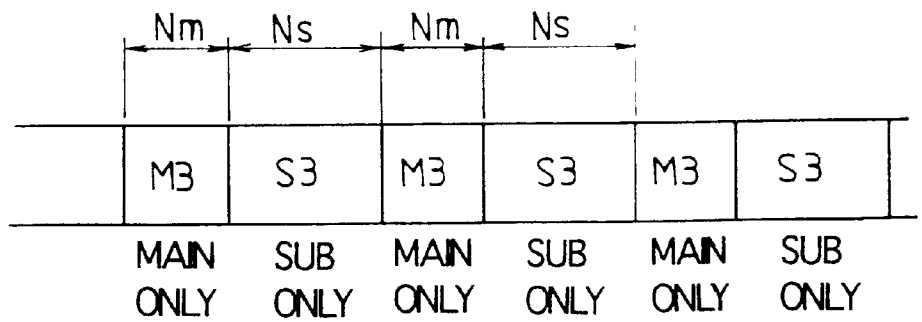
FIG. 8 is a diagram for explaining how to switching the main and sub heaters in the prior art.
Figure 9:
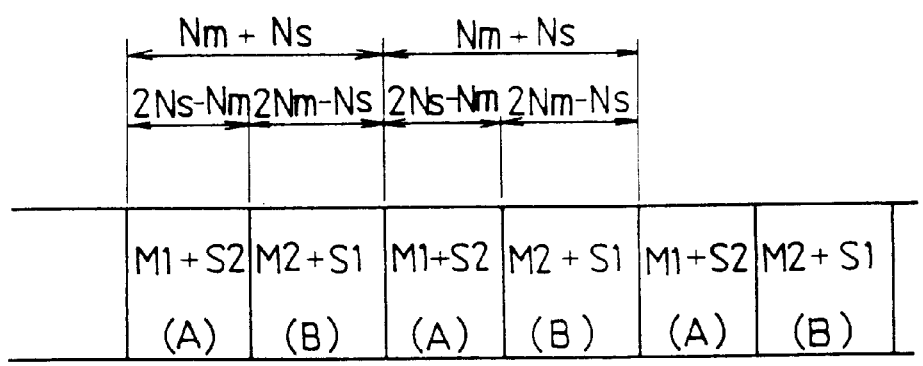
FIG. 9 is a diagram for explaining how to switching the main and sub heaters in the embodiment of the invention, as opposed to FIG. 8.

FIG. 7 shows the way of switching in this embodiment. First, as shown in state M1, the main heater 2 is driven for a half-wave period and then, as shown in state S2, the sub heater 3 is driven alone for a two-half-wave period following the driving of the main heater, and such control is repeated. The summed current is shown in state M1+S2 in which the current change due to the switching between the two heaters is in the form of small divisions in every three half-wave cycle. The power-supply voltage change due to the three half-wave cycle occurs at very small intervals and is not actually perceptible as flickers of the light. In fact, considering in this way, if the conventional dual-heater switching is performed as shown in FIG. 8 wherein the main heater 2 is driven by consecutive Nm half-waves (M3), followed by the driving of the sub heater 3 by consecutive Ns half-waves (S3) and this control is repeated, then the equivalent heater switching at the three half-wave cycle can be carried out in the pattern as shown in FIG. 9. This FIG. 9 pattern combines the main heater 2's one half-wave driving out of three half-waves (M1 state in FIG. 7) with the sub heater 3's two half-wave-driving out of three half-waves (S2 state in FIG. 7), resulting in a first driving pattern shown as the state M1+S2 in FIG. 7. This driving pattern lasts for 2Ns−Nm half-waves (portion A in FIG. 9) in the first sub period of the third period. In this case, it is assumed that 2Ns>Nm and 2Nm>Ns.

Then, in the second sub period of the third period, 2Nm−Ns half-waves (portion B in FIG. 9) are applied by a combined pattern of the main heater 2's two half-wave driving (state M2 in FIG. 7) and the sub heater 3's one half-wave driving (state S1 in FIG. 7), that is, a second driving pattern as shown as the state M2+S1 in FIG. 7. Such repetition of the portions A and B in FIG. 9 is equivalent to the prior art switching pattern shown in FIG. 8. The reason is as follows.

(1) The repetitive cycle of the portions A and B, when A and B are taken as one cycle, includes Nm+Ns half-waves, and hence, is the same as that of the conventional pattern (FIG. 8).

(2) In the portions A and B of FIG. 9, the total number of driving half-waves for the main heater 2 is Nm and that of the sub heater 3 is Ns, which is the same as the number of driving half-waves within one cycle of the conventional pattern.

(3) The above items (1) and (2) show that the amount of heat generated by each heater, if seen for a whole cycle, is apparently the same as that in the conventional pattern.

In further consideration, the difference in average current of the portions A and B of FIG. 9 could be a problem although it was reviewed that the current change within the three half-wave cycle is not problematic. However, evaluating the amount of the difference, the average current in the portion A is ($\frac{1}{3}$)Im+($\frac{2}{3}$)Is and the average current in the portion B is ($\frac{2}{3}$)Im+($\frac{1}{3}$)Is. Therefore, the difference in average current between the portions A and B is:

$$(({\textstyle\frac{1}{3}})Im+({\textstyle\frac{2}{3}})Is)-(({\textstyle\frac{2}{3}})Im+({\textstyle\frac{1}{3}})Is) = ({\textstyle\frac{1}{3}})(Is-Im)$$

It is seen that this is one third as large as the difference in the prior art. (Here, Im is a value of a static current flowing when the main heater 2 is full-cycle driven, and Is is that of the sub heater 3.)

Figure 10:
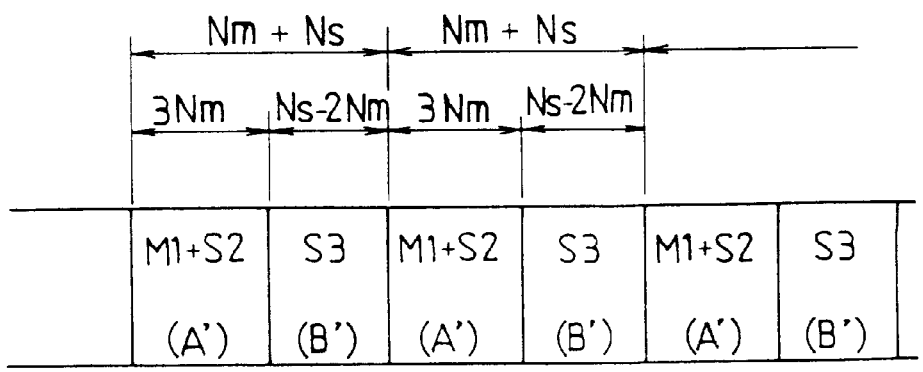
FIG. 10 is a diagram showing a modification of the driving states for the main and sub heaters shown in FIG. 9.

Now, assume a special case where 2Nm≦Ns. In this case, the number of half-waves in the portion B of FIG. 9 would become negative. Then, as shown in FIG. 10, for 3Nm half-waves the sub heater 3 is driven in the state S2 while the main heater 2 is driven in the state M1, and thereafter the sub heater 3 alone is driven in the state S3 for (Ns−2Nm) half-waves. Even in this case, the repetitive cycle is T=Nm+Ns (the number of half-waves). The number of half-waves driving the main heater 2 during the period T is Nm, and that of the sub heater is Ns, which is the same as in the prior art. Further, the difference in average current between the portions A' and B' is:

$$(({\textstyle\frac{1}{3}})Im+({\textstyle\frac{2}{3}})Is)-Is=({\textstyle\frac{1}{3}})(Im-Is)$$

This shows that the difference is one third as large as that in the prior art (FIG. 8).

The case of 2Ns≦Nm can be considered similarly. That is, although not shown, the portions A' and B' are considered as the state S1+M2 and the state M3, respectively. In this case, the numbers of half-waves for the portions A' and B' are 3Ns and Nm−2Ns, respectively. The difference in average current between the both portions A' and B' is:

$$(({\textstyle\frac{1}{3}})Is+({\textstyle\frac{2}{3}})Im)-Im = -({\textstyle\frac{1}{3}})(Im-Is)$$

Although the sign is opposite to that in the foregoing case, it is seen that the absolute value of the current difference is still one third as large as that in the prior art.

In summary, in this embodiment, at the start of driving the heaters (during the first and second periods) half-waves are thinned to start the average current at a low level, and when switching between the heaters (during the third period) the main and sub heaters 2 and 3 are switched at a ratio of one half-wave and two half-waves in the three half-wave cycle, which will raise the power-fluctuating frequency caused by the difference in current between the heaters, resulting in no flickers perceptible to the human eye with respect to the light connected to the power line.

Figure 11:
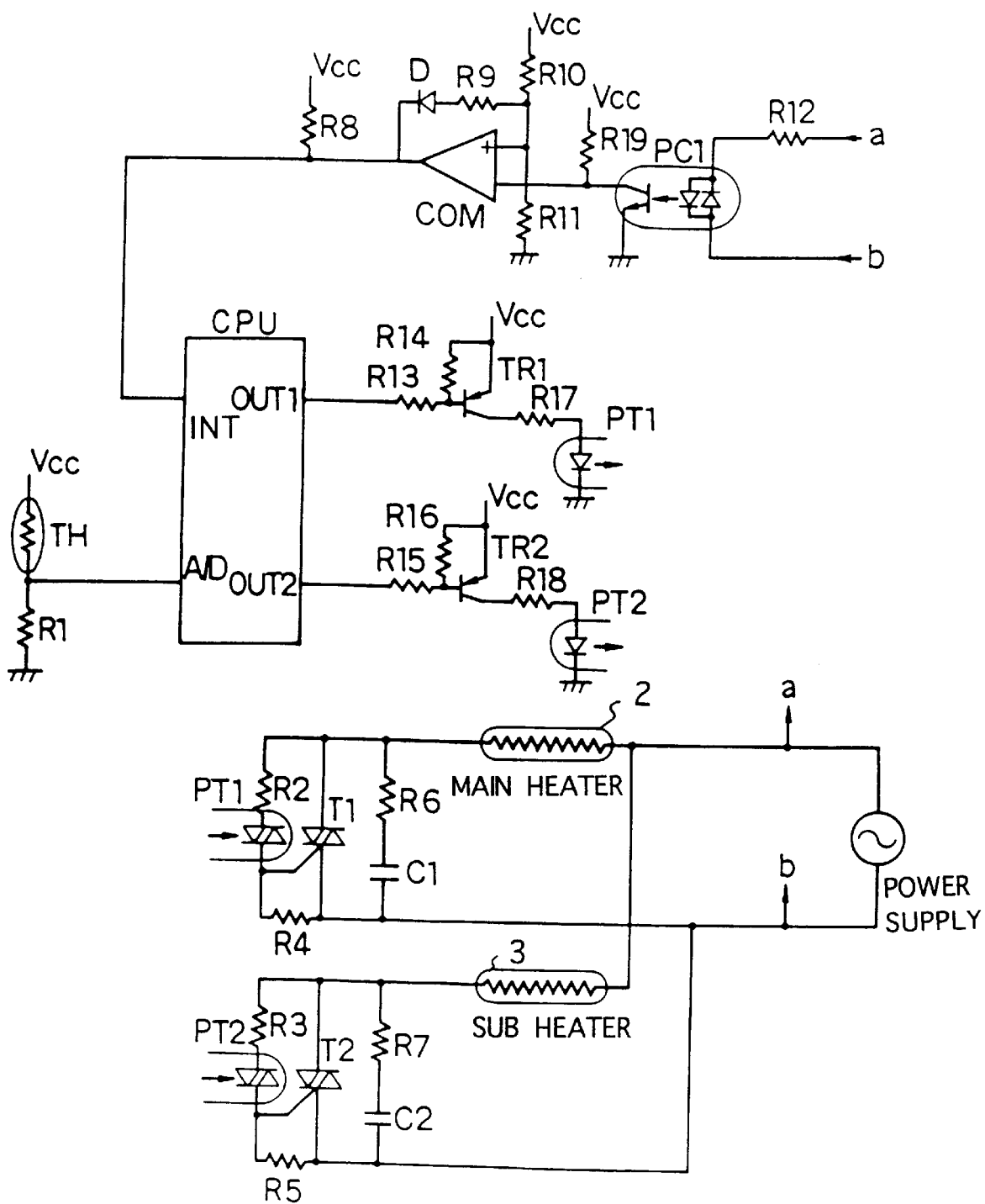
FIG. 11 is a diagram of a circuit for carrying out the driving states of the main and sub heaters in the embodiment of the invention.

FIG. 11 is a diagram of a circuit for implementing the above mentioned "wave number control".

Figure 1:
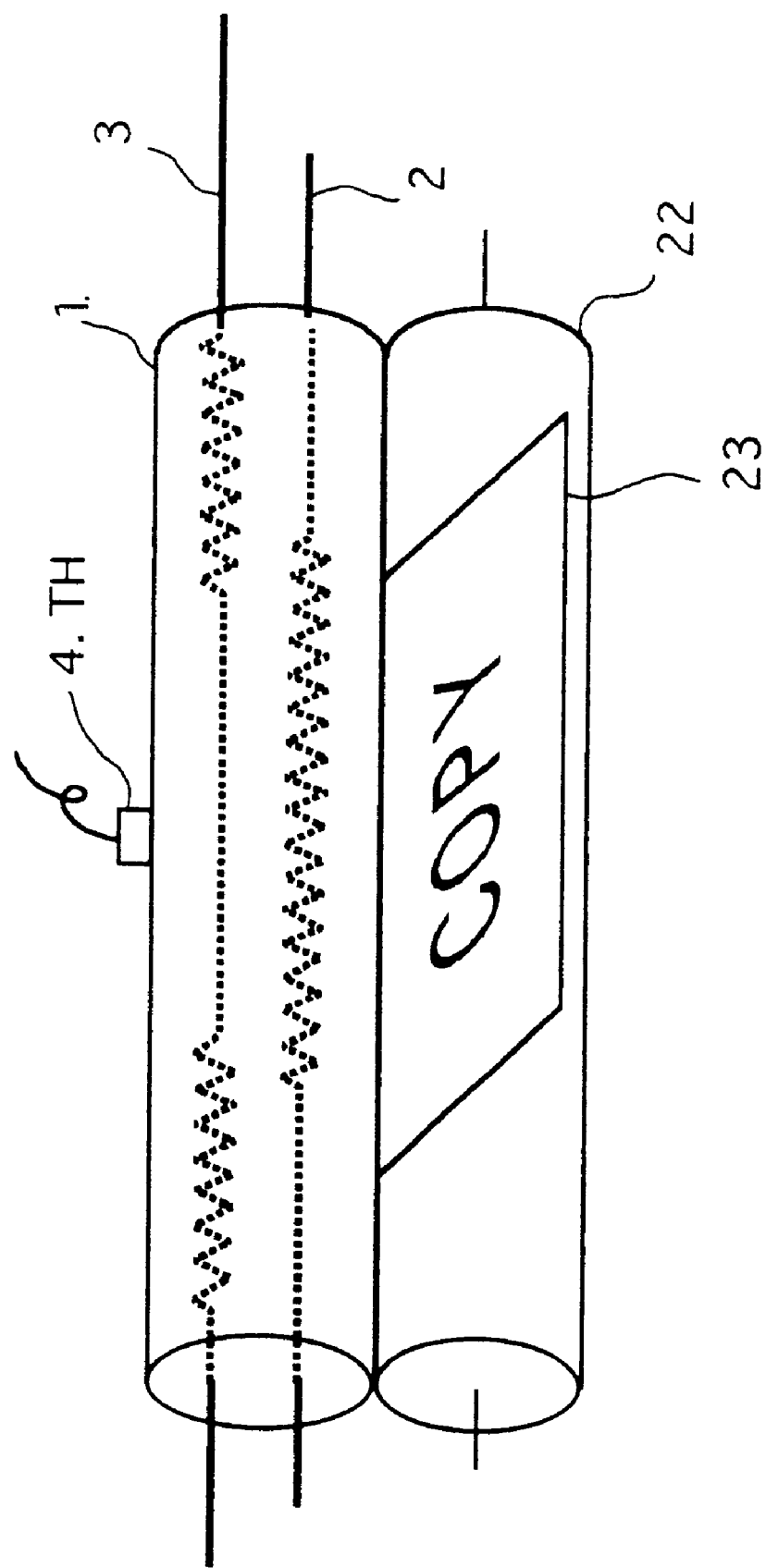
FIG. 1 is a schematic diagram showing a fixing unit to which the present invention is applied.
Figure 13:
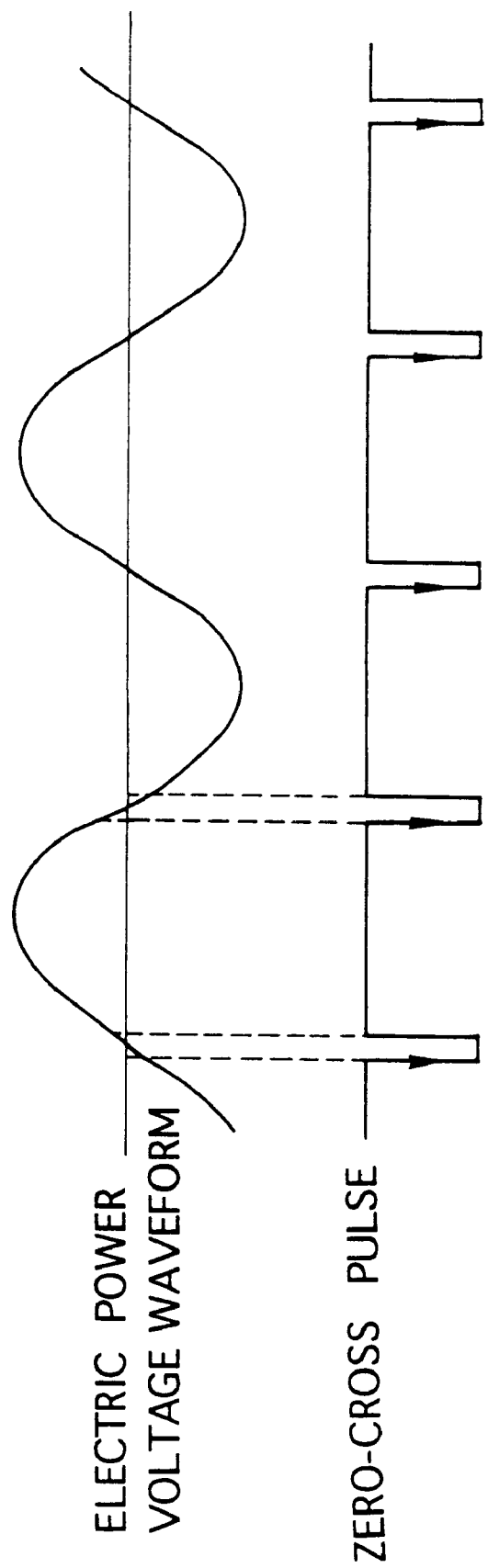
FIG. 13 is a diagram for explaining zero-cross pulses of a power voltage which are detected by the circuit of FIG. 11.

In this drawing, TH indicates a temperature sensor (4 in FIG. 1) such as a thermistor for detecting the temperature of the heater roller (1 in FIG. 1). The thermistor TH is connected to a resistor R1 and the divided voltage potential is applied to an analog input A/D of the CPU. The signal applied to the A/D input is converted into a digital signal and processed in the CPU. An INT input of the CPU receives a zero-cross pulse signal (see FIG. 13) which indicates zero-crossing points in the AC power voltage. The zero-cross pulse signal is generated based on the AC voltage input from the power supply by a photocoupler PC1 and a comparator COM.

Each falling edge of the zero-cross pulse activates an interrupt routine (described below) of the CPU such that signal OUT1 or OUT2 is generated for turning on the main heater 2 or the sub heaters 3, respectively, at predetermined timing after each falling edge of the zero-cross pulses. For example, when the OUT1 signal is at a high (H) level, a transistor TR1 is in its OFF state, causing the light emitting element of the photo-triac PT1 to remain off. Its light-receiving-side photo-triac is also in its OFF state which provides no current to the gate of a triac T1. Then, the triac T1 remains off, keeping the main heater 2 off. In this embodiment, the transistor TR1, photo-triac PT1 and triac T1 constitute the "switching means".

Conversely, when the OUT1 signal is at a low (L) level, the transistor TR1 is turned on, turning on the photo-triac PT1's light emitting diode, which in turn turns on the receiving-side photo triac. The light receiving element of the PT1 conducts, providing a gate current limited by resistors R2 and R4 to the gate of the triac T1. Thus, the triac T1 is turned on to turn the main heater 2 on.

Resistor R6 and capacitor C1 connected in parallel with the triac T1 constitutes a so-called snubber circuit which prevents the triac T1 from being turned on by its itself depending on an abrupt change in the power-supply voltage due to external noises or the like. (This also applies to resistor R7 and capacitor C2).

The effect of the OUT2 which controls the turning-on of the sub heater 3 is the same as described above.

A practical example of the control performed by the above described circuit will be explained. Here, two driving patterns used when switching between the main and sub heaters 2 and 3 are those corresponding to the states A' and B', but another combination of the driving patterns as shown in FIG. 9 can be used as necessary for applications.

Figure 12:
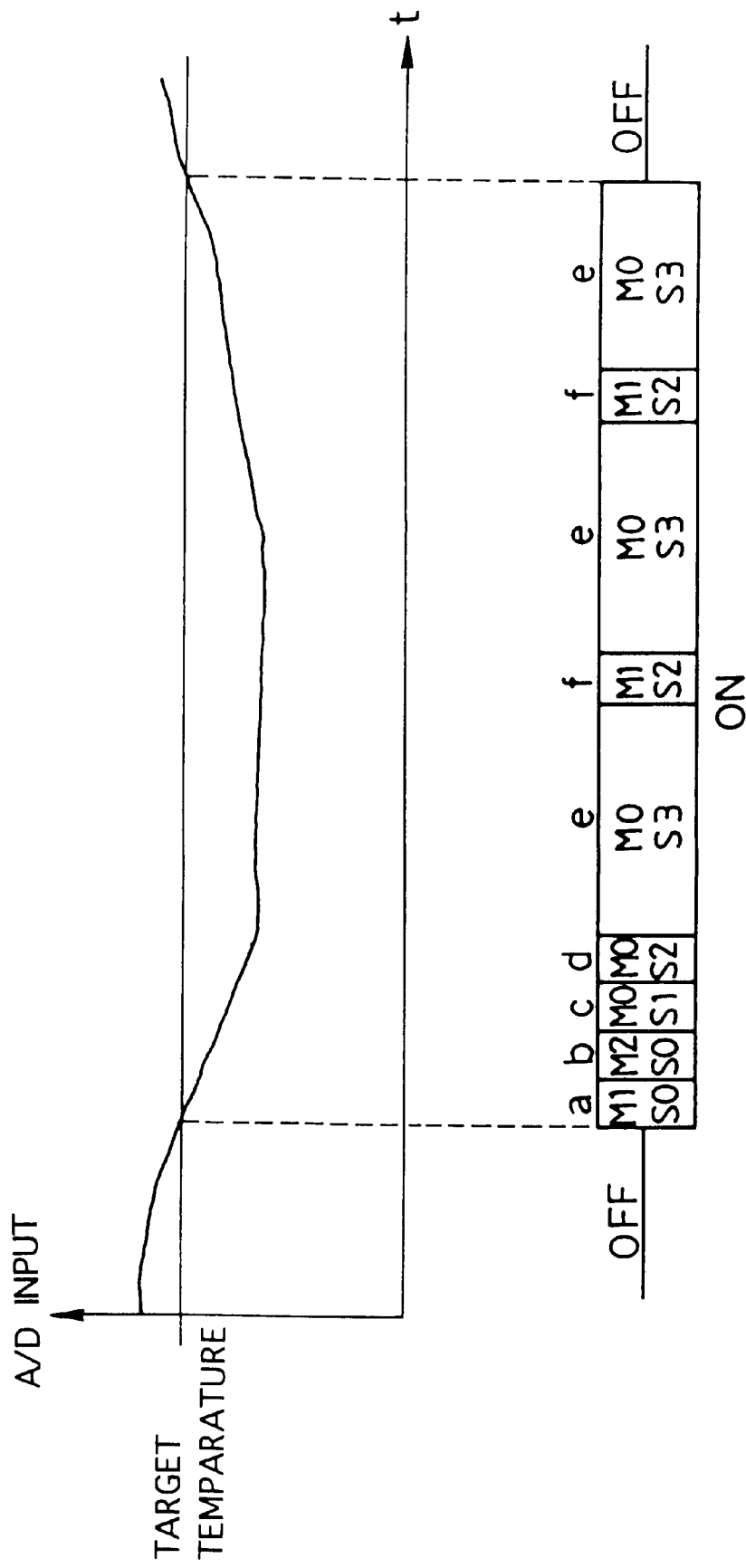
FIG. 12 is a diagram showing a specific example of the control performed by the circuit of FIG. 11.

As shown in FIG. 12, when an A/D input to the CPU in FIG. 11, i.e., a signal representing the temperature of the heater roller, is above a target temperature (the roller temperature is high), the main and sub heaters 2 and 3 are both off. When the A/D input becomes below the target temperature, then as shown in FIG. 12, the heaters are driven in states a, b, c, d and e, in the named order and then in states f, e, f, e, . . . repetitively until the roller temperature reaches the target temperature Among these states, the state a is one of the states shown in FIG. 7 where the main heater 2 is in the M1 driving state (i.e., one half-wave is on in the three half-wave cycle), and the sub heater 3 is off. In the state b, the main heater 2 is in the M2 driving state (waveform M2 in FIG. 7), and the sub heater 3 is off. In the state c, the main heater is off and the sub heater 3 is in the S1. In the state d, the main heater 2 is off and the sub heater 3 is in the S2.

In this way, in the first and second periods, the states a, b, c and d act to relieve the change in each heater current. This is the same as the description of FIG. 6 which has already been explained. Regarding the states e and f in the third period following the first and second periods, the state e has the main heater 2 in its OFF state and the sub heater 3 in its full ON state (S3). The state f has the main heater 2 in the M1 driving state and the sub heater 3 in the state S2. This pattern is the same as that shown in FIG. 7 and described above. In summary, this is an operation for reducing current changes which occur when switching between the main and sub heaters 2, 3.

Figure 14:
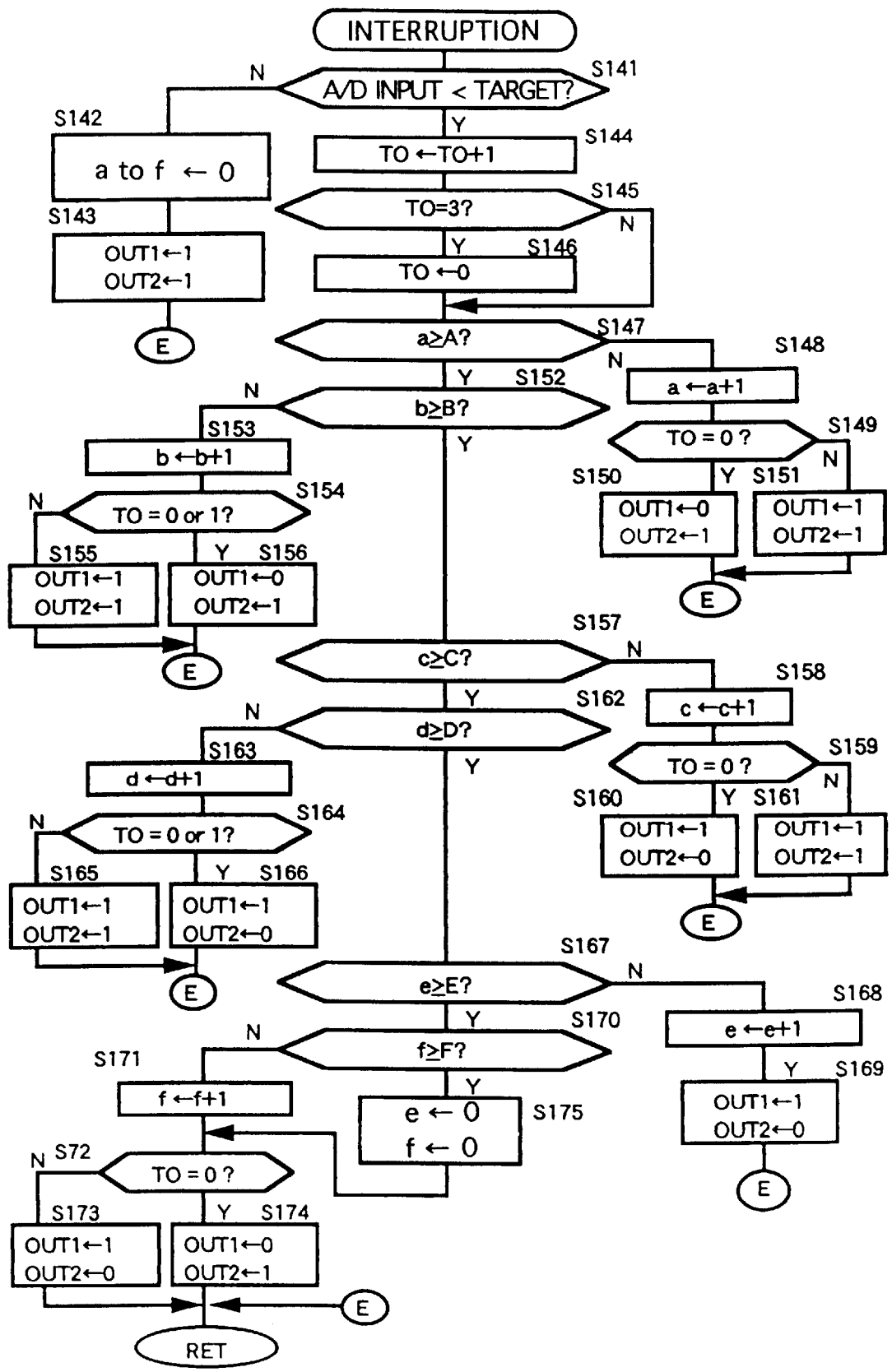
FIG. 14 is a flowchart showing an example of an interrupt processing which is executed by the CPU shown in FIG. 11.
Figure 15:
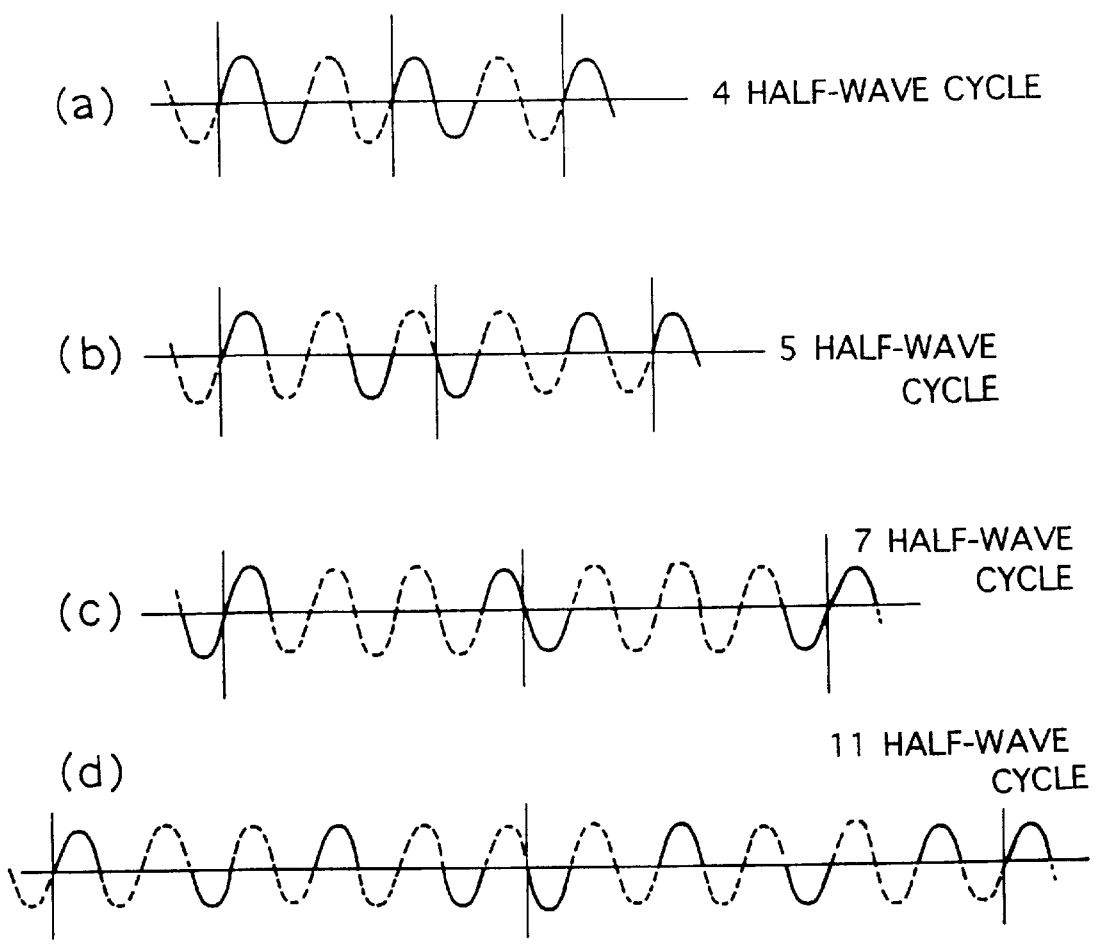
FIGS. 15(a)–(d) show waveforms which represent modifications of the present invention.

FIG. 14 is a flowchart showing an example of software steps to implement the above-described control.

It was aforementioned that the interrupt input INT of the CPU (FIG. 11) is provided with the zero-cross pulses. At the falling edge of each of the zero cross pulses, the CPU internal processing is interrupted to perform the procedure as shown in FIG. 14.

First, when the A/D input value is greater than the target value, decision step S141 causes control to proceed to the N branch where counters a, b, c, d, e and f are each reset to an initial value "0" (S142). The outputs OUT1 and OUT2 are set "1" (S143), which causes both the main and sub heaters 2, 3 to be turned off. The counters a, b, c, d, e and f are to determine heater-ON durations of the states a, b, c, d, e and f, respectively. The durations are managed with the number of zero-cross pulses or half-waves.

When the A/D input value becomes lower than the target value (the temperature is low), which is checked at step S141 each time the interrupt occurs, control proceeds to the Y branch. At this time, a thinning counter (TO) is incremented by "1" (S144). The thinning counter TO is incremented to circulate sequentially among three states in a manner of 0, 1, 2, 0, 1, 2, . . . , each time this part of the flow is passed for each interruption. When the count becomes equal to "3" at decision step S145, it is reset to the initial value "0". The counter TO acts, in the subsequent processing, as a pointer for pointing where in the three half-wave cycle the present half-wave resides.

At decision S147, if the count of counter a is less than a predetermined value A, i.e., in the state a of FIG. 12, then control proceeds to the N branch, incrementing the counter a by "1" (S148). The predetermined value A is defined by the number of half-waves in the state a (this applies to other predetermined values stated below). Then in decision step S149, the count of the thinning counter TO is checked. If this value is zero, then the main heater 2 is turned on (S150) and otherwise (if one or two) the main and sub heaters 2 and 3 are both turned off (S151).

When the heater temperature is lower than the target temperature, each time the falling edge of the zero-cross pulse is applied to the INT input, the thinning counter TO is cyclicly incremented (0, 1, 2, 0, . . . ). If the counter a is less than the predetermined value A, then the flow passes through decision step S149 and turns the main heater 2 on cyclically once a three half-wave cycle. It can be said that decision step S149 realizes the driving state M1 as shown in FIG. 7. If the counter a reaches the value A, then the state a in FIG. 12 is terminated, followed by the state b started. Specifically, the counter b is checked at step S152 in the flow such that if the count is less than the predetermined value B, then the flow proceeds to the N branch and increments the counter b by one (S153). At decision step S154, only when the count of the thinning counter TO is "0" or "1", the main heater 2 is turned on (S155, S156). This realizes the driving state M2 as shown in FIG. 7.

Similarly, decision step S157 checks whether the current state is the state c in FIG. 12. If so, the counter c is incremented by one at step S158. The thinning counter TO is examined (S159) and if the count is "0", then the sub heater 3 alone is turned on, thus realizing the S1 state (in FIG. 7) (S160, S161). Then, decision step S162 finds the state d to increment the counter d (S163), and decision step S164 causes the sub heater 3 alone to be in the S2 state (S165, S166). Further, decision step S167 finds the state e and increments the count of the counter c by one (S168). Then, only the sub heater 3 is forced in the S3 state (S169).

Thus, the states a to e have been completed. That is, a sequence of the start-up steps as shown in FIG. 6 has been completed.

At next step S170, it is judged whether the current state is the state f of FIG. 12. While the counter f is less than the predetermined value F, control flows to the N branch and increments the counter f by one (S171). Decision step S172 checks the thinning counter TO such that if the count is "0", then only the main heater 2 is turned on (S174) and otherwise only the sub heater 3 is turned on (S173). As a result, the M1+S2 driving state (in FIG. 7) is realized which combines the main heater's M1 state and the sub heater's S2 state.

When the counter f reaches the value F, then decision step S170 routes the flow to the Y branch where the counters e and f are reset to the initial value "0". This results in that because the counter e's reaching the predetermined value has been reset at step S167 in the subsequent INT interruption process, the state e is reentered (sub heater 3 is turned on in the state S3), and the two states f and e are repeated.

Thus, it has been described that the heater driving pattern shown in FIG. 12 can be realized.

Alternatively, the counters a to f may initially be set with the predetermined values A, B, C, D, E and F such that their counts are decremented to check them as to whether they reach zero.

The above-described embodiment is advantageous in the following points:

(1) The control hardware is relatively simple. For example, in the prior art phase control system raised as a general means for suppressing the heater current as mentioned above, it was necessary to generate a pulse to indicate a phase angle (a short time less than a half-wave duration) at which the heater is to be turned on, by setting a timer at a zero-cross point of the power-supply voltage. This complicated the control itself as well as necessitated hardware such as a timer mechanism. In the "wave number control" of the present invention eliminates the need of such a timer for indicating the phase because heaters are turned on at zero-cross points. This also reduces the complexity in control such as set-up and activation of the hardware.

(2) Another advantage, when compared to the phase control, includes that the "wave number control" is almost free from a so-called power-supply harmonics, i.e., current changes at higher multiple order of electric power frequency on the power line because of the application of heater current at the zero-cross points. In order to suppress such power-supply harmonics, it has been common to insert a large inductance (choke coil) in series with the heater. However, this raised the cost of the device due to the additional electric component, and its requirement of providing space hampered the device from being compact.

(3) It is possible to reduce the current changes due to the heater switching by the drive switching control of the heaters 2 and 3 at relatively short time intervals.

Although a typical example of the "wave number control" has been described, the following modifications are possible.

FIG. 6 shows an example of reducing the rush current. For example, ⅓ half-wave control can directly be followed by the full-period control without the states b and d. This still can provide a certain effect in reducing the current changes. Likewise, the states b and d can directly be followed by the full-period control without the states a and c.

After all, the present invention includes in its scope all the combinations which can reduce the amount of the rush current by thinning one or two half-waves from the three-half-wave cycle at the start of the heater driving.

With regard to FIG. 9 showing the alternate switching between the main and sub heaters 2 and 3, which is a sort of so-called flickering driving, the present invention includes in its scope all the combinations, of one or two half-waves thinned from three-half-waves for the main and sub heaters 2, 3 if it reduces the difference in switched currents as compared to the prior art full period application.

Having described hereinbefore mainly a three-half-wave cycle based scheme, for example, the wave number control as shown in FIGS. 6 and 7 is possible with either of four-half-wave cycle, five-half-wave cycle, seven-half-wave cycle, eleven-half-wave cycle, etc.

Further, even in a case of using a single heater, the control as shown in FIG. 6, which gradually increases the number of half-waves, is effective.

According to the present embodiment, it is possible to reduce the abrupt current changes due to the halogen heaters without using the phase control, to thereby provide relatively simple control hardware configuration. In addition, the application of current to the heaters at zero-cross point almost eliminates the power supply harmonics on the power line. Further, even in a fixing unit with the main and sub heaters, the problem associated with the switching between the heaters is solved by the best control timing of the two heaters, with similar advantages.

Figure 16:
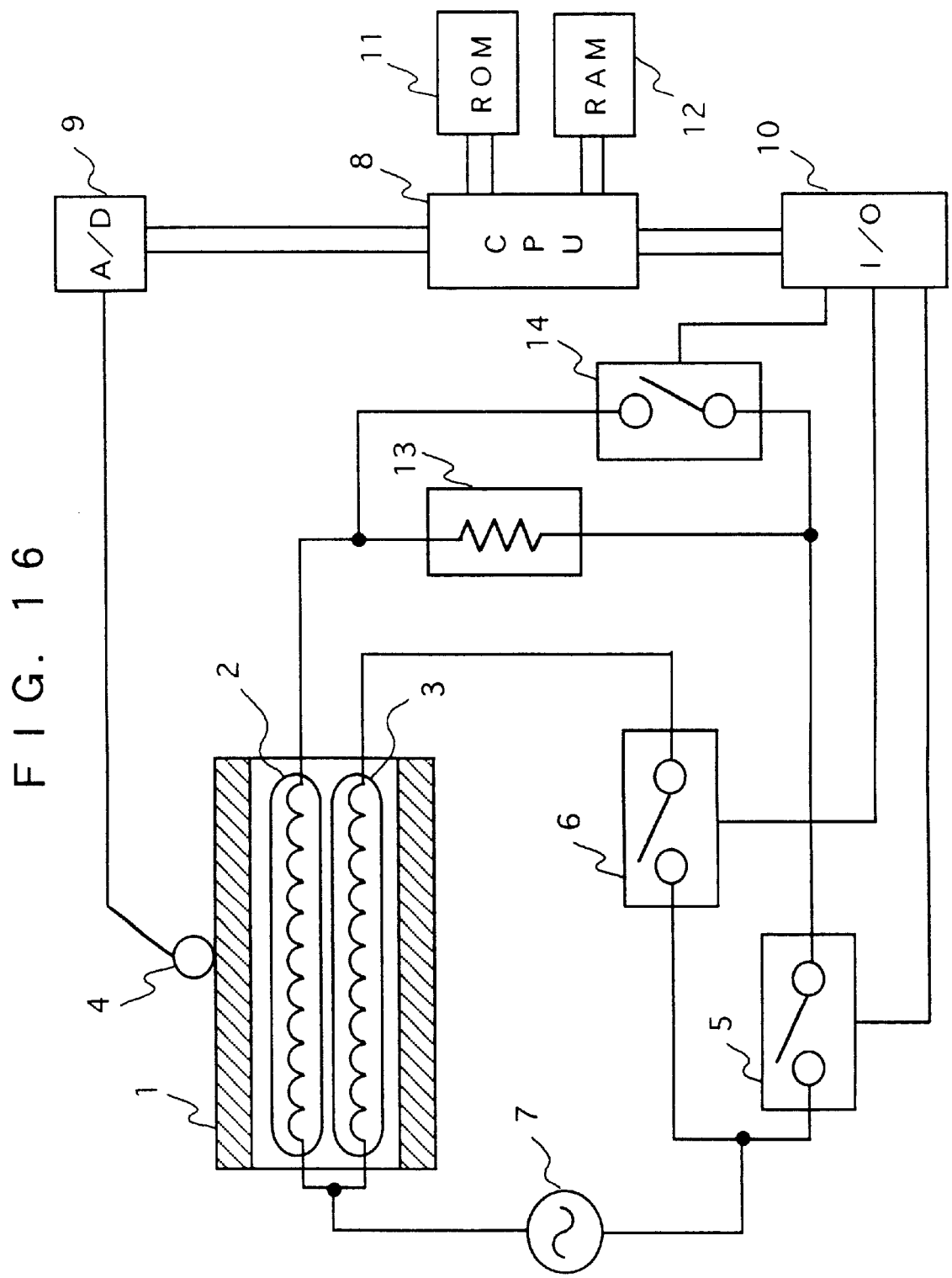
FIG. 16 is a block diagram showing a general configuration of the main part of an image forming device according to a second embodiment of the invention.

FIG. 16 is a block diagram of a main part, related to the fixing unit, of an image forming device in a second embodiment of the present invention. Like elements in this FIG. and FIGS. 1, 11 have like reference numerals.

This fixing unit comprises a fixing roller 1 which includes therein a main heater 2 and a sub heater 3. It is assumed in this embodiment that the power consumption of the main heater 2 is greater than that of the sub heater 3. The main and sub heaters 2 and 3 are provided with AC current from the AC power supply 7 on the basis of turning on and off of the switching elements 5 and 6, respectively. The main and sub heaters 2 and 3 may have different intensity distribution in temperature in the longitudinal direction of the fixing roller 1.

In this specification, the main and sub heaters 2 and 3 are generally referred to simply as "heaters".

Located adjacent to the surface of the fixing roller 1 is a temperature sensor 4 such as a thermistor. Information from the temperature sensor 4 is converted via an A/D converter 9 into a digital signal and input to a CPU 8. The CPU 8 performs a predetermined process based on the information so as to control, via I/O 10, the switching elements 5 and 6.

Further, in this embodiment, a resistor 13 is provided such that it is connected in series with the main heater 2 of a greater power consumption. This resistor can be removed from the circuit by short-circuiting the both ends thereof with the switching element 14 during a predetermined period which is mentioned below. The CPU 8 coupled to ROM 11 and RAM 12 performs a predetermined process and controls the switching of the switching elements 5, 6 and 14 according to the control program and data which are prestored in the ROM 11. Of course, the CPU 8 can also control other components in the image forming device. The RAM 12 provides temporary data storage area and work area for the CPU 8.

FIGS. 17(a) (b) and (c) are a timing chart showing control of the heater driving. The heater control is carried out based on the temperature of the fixing roller 1 which is detected by the temperature sensor 4 disposed adjacent to the fixing roller. In this embodiment, when the temperature of the fixing roller 1 becomes lower than a lower limit value prestored in the ROM 11, then the heaters are driven at the timing shown in FIGS. 17(a) and (b). FIG. 17(a) shows a driving timing for the main heater 2 and FIG. 17(b) shows that for the sub heater 3. FIG. 17(c) shows an on/off timing for the switching element 14 associated with the resistor 13 for preventing the rush current. The switching element 14 is normally in its OFF state (low level) during which the resistor 13 is put in series with the main heater 2.

In the timing chart of FIGS. 17(a), (b) and (c), the resistor 13 is in series with the main heater 2 for a time t1 after the resistor is turned on. After the time t1 has elapsed, the switching element 14 is turned on, thus removing the resistor 13 from the circuit. This means that the insertion of the resistor 13 in series with the main heater 2 provides a greater resistance of combined resistors of the system for a period during which the heater resistance is low immediately after the starting of the heater driving, thereby reducing the rush current. At the time the time t1 has elapsed, the resistance of the main heater 2 will becomes greater to a certain extent due to the increase in temperature of the main heater 2, and hence, the removal of the resistor 13 will not make a great rush current at that moment. The time t1 during which the resistor 13 is in the circuit is preferably determined depending upon the power consumption of the main heater 2 and the resistance of the resistor 13. In this embodiment, the consuming power of the main and sub heaters 2 and 3 are 950 W and 300 W, respectively, the resistance of the resistor 13 is 26 Ω, and the time t1 is 500 ms. However, this is only an example of implementation, and the present invention is not limited thereto. For example, in a case where the sub heater 3 is turned on for a short time prior to the main heater 2's turning-on as described later, the resistance of the resistor 13 may be 15 Ω and the time t1 may be 200 ms.

Although even the insertion, alone, of the resistor 13 is effective in preventing the rush current, in addition to this the sub heater 3 of a smaller power consumption is, in this embodiment, turned on for a short time (e.g., several 10 milli-seconds) immediately before the main heater 2 is turned on, as shown in FIGS. 17(a) and (b). The ON duration t3 of the main heater 2 can vary depending upon the situation, for example, in the order of 6 or 7 seconds. The short ON duration of the sub heater 3 before the main heater 2's turning-on is not sufficient to warm up the temperature of the sub heater 3 by a necessary amount, and therefore the sub heater 3 has to be re-turned on. This sub heater's re-turning-on is made after a time t2 has elapsed from the main heater's turning-on so as to fully warm up the main heater 2. In this embodiment, the time t2 is approximately one second. Such control reduces the amount of abrupt change in current. A more specific explanation will be given with reference to the waveform of a current flowing in the power supply, of FIG. 18.

Figure 18:
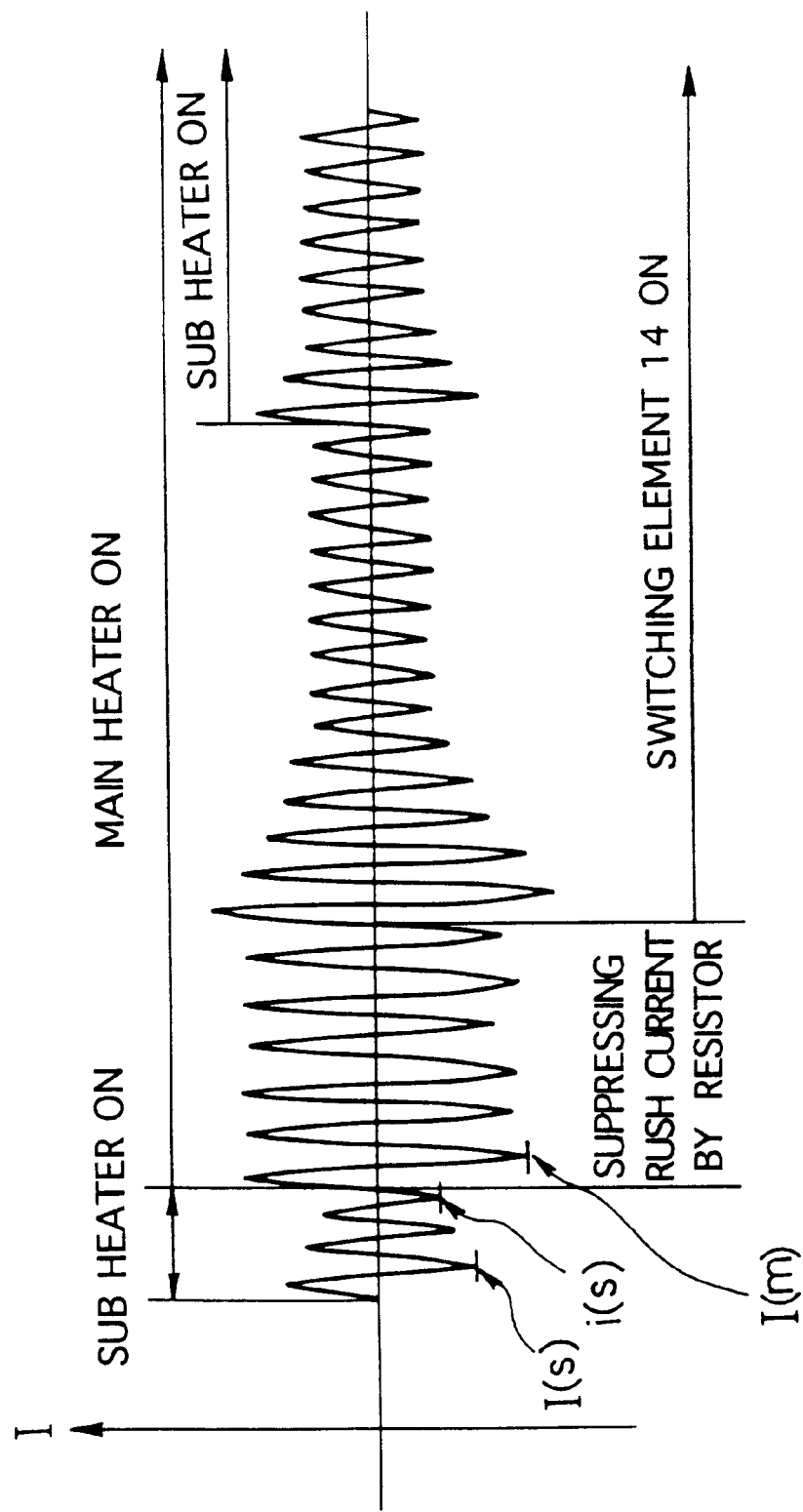
FIG. 18 shows a current waveform appearing in a power supply in the second embodiment of the invention.

FIG. 18 shows a current waveform of the power supply which corresponds to the timing chart shown in FIGS. 17(a), (b) and (c). When the temperature sensor 4 detects the temperature fall, the CPU 8 first turns the sub heater 3 on for several 10 milli-seconds. Then, the sub heater 3 is turned off and at the same time the main heater 2 is turned on. This reduces the abrupt current change which occurs at the start of driving the heaters.

The principle of reduction in the current change is as follows. Since the main and sub heaters 2 and 3 are independent of each other, a current of a peak value I(m) flows at the moment the main heater 2 is turned on as shown in FIG. 18. Therefore, if the sub heater 3 is not turned on immediately before the main heater's turning-on, then the current of I(m) would flow instantaneously at that moment. At the moment the sub heater 3 is turned on, a current of I(s) also flows, but this current I(s) will not be a problem since its power consumption is small. Now, assume that i(s) is the current flowing in the sub heater 3 several 10 milliseconds after the sub heater's turning-on. At this moment, if the sub heater 3 is turned off while turning the main heater 2 on at the same time, then the current change at that moment is I(m) i(s), thus reducing the amount of instantaneous change in the current flowing in the power supply. For this reason, the ON duration of the sub heater 3 has to be short enough to ensure that the current is not attenuated due to the increase in temperature.

Such control relieves the necessity of reducing the magnitude of the rush current itself occurring at the main heater's turning-on. As a result, the resistance of the resistor 13 can be relatively small. This small resistance increases the current flowing in the main heater 2, which will advance the warming up of the heater. Therefore, the time during which the resistor 13 is in series with the heater can be shortened. As a result, the power consumption of the resistor 13 can be lowered, eliminating the problem caused by that. In addition, the current change is made smooth, which will reduce the flickers of the light, etc.

At the time the sub heater 3 is re-turned on the main heater 2 remains on, which means that the currents flowing the both heaters are summed. However, the sub heater's re-turning-on is made after the main heater 2 is sufficiently warmed up, and hence, the current in the main heater 2 has lowered, allowing the sum of the both currents to be small.

When the driving of the heaters is terminated, the main heater 2 is first turned off, and then, after a certain period of time, the sub heater 3 is turned off. Such control also allows the amount of abrupt change in current in the termination of the heater driving.

Although the resistor is used as means for preventing the rush current in this embodiment, another means such as the phase control, i.e., the prior art technique with no resistor, or the wave number control as described in the first embodiment may be employed. In such cases, it is also effective to turn the sub heater on for a short time just before the main heater's turning-on.

Alternatively, as means for preventing the rush current, a power thermistor may effectively be used which exhibits a resistance-temperature characteristic (i.e., resistance decreases as temperature rises) opposite to that of the halogen heater. In this case, the resistor 13 in FIG. 16 is replaced by the power thermistor and the switching element 14 is removed.

Figure 19:
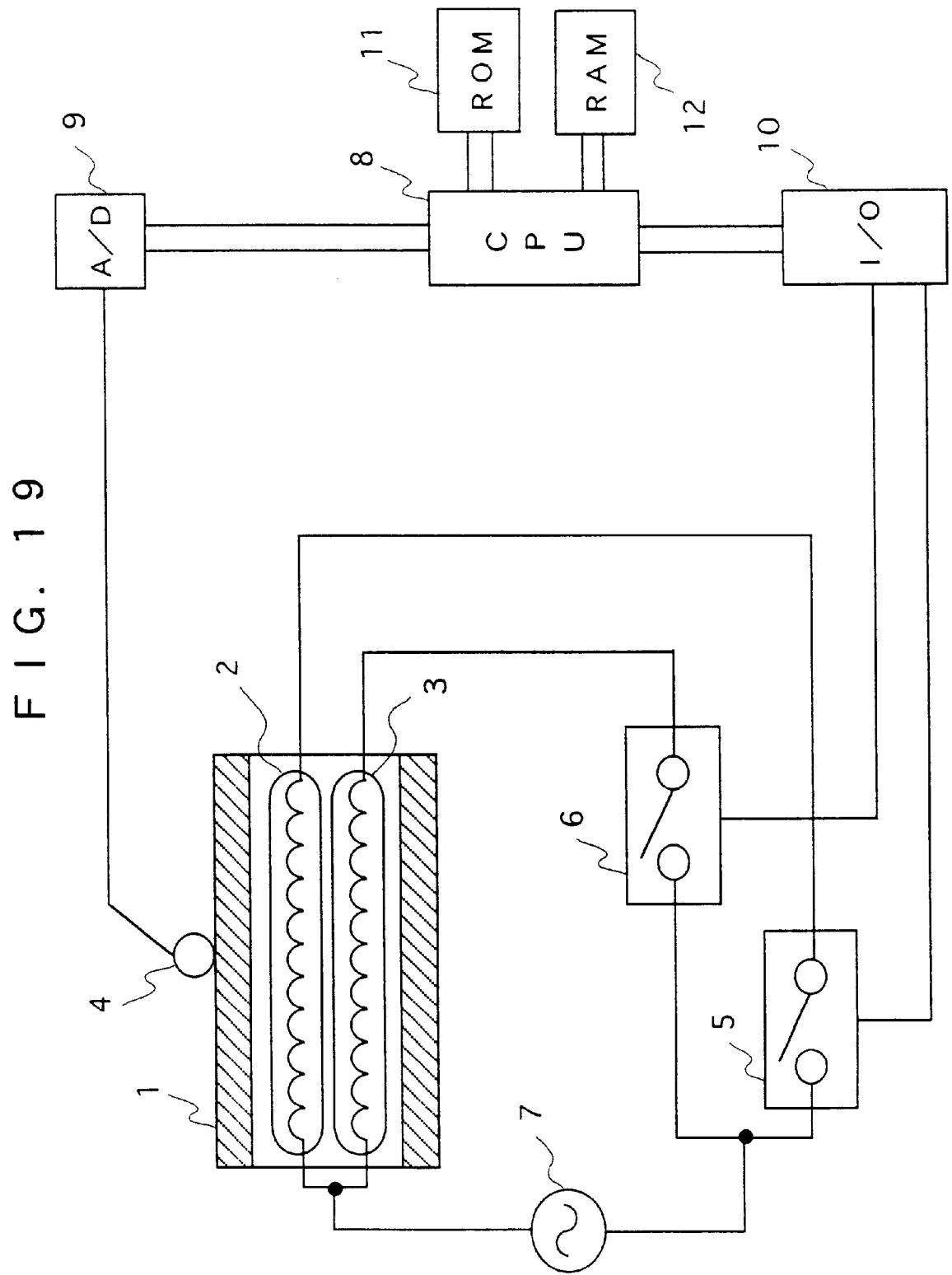
FIG. 19 is a block diagram showing a general configuration of the main part of an image forming device according to a third embodiment of the invention.

FIG. 19 shows a block diagram showing a configuration of a third embodiment of the present invention. In FIG. 19, like components in FIG. 16 are assigned with like reference numerals. Differences from the FIG. 16 configuration are that the resistor 13 and switching element 14 are removed in FIG. 19 and that the control program stored in the ROM 11 is different.

Referring to the timing chart shown in FIGS. 20(a) to (f), an explanation will be given of the control of the two heaters in the third embodiment. In this embodiment, the control of the main and sub heaters 2 and 3 include a "normal driving" which is carried out when temperature becomes low, and an "intermittent driving" which is carried out during the period other than the "normal driving". The normal driving is the same control as described in the second embodiment. However, the insertion of the resistor 13 is not essential, and the resistor 13 and switching element 14 are removed as shown in FIG. 19. The "intermittent driving" is to prevent the heater temperature from being lowered so as not to cause its resistance to decrease during periods other than the normal driving. This concept itself is known as described in the background art. In this embodiment, by employing a plurality of heaters of different power consumptions and skillfully combining their controlling, it is possible to reduce the amount of instantaneous current change. This is not to reduce the peak value, per se, of current, but is effective in reducing or flickers of the light and noises.

Figure 20:
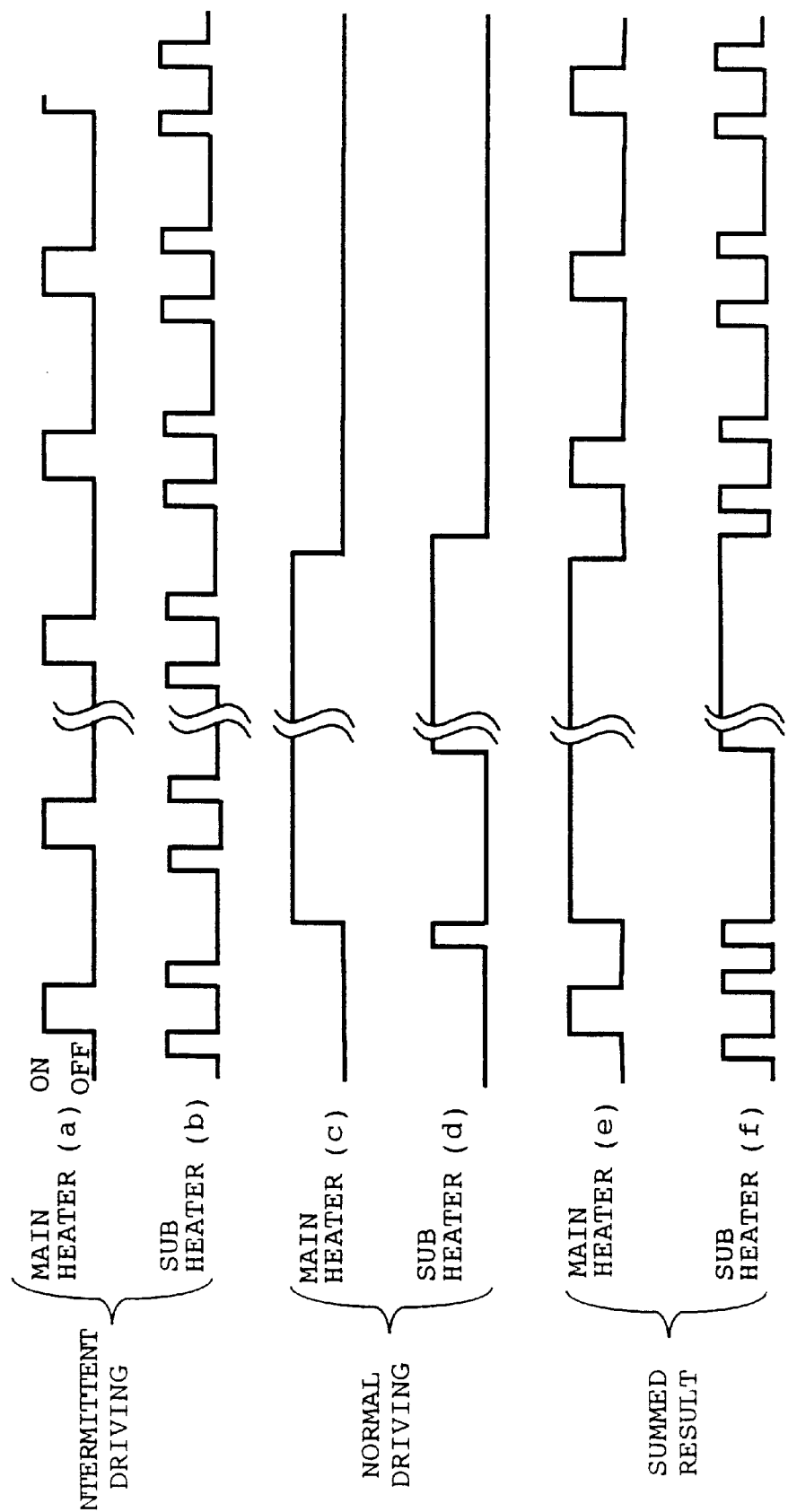
FIGS. 20(a)–(f) are a timing chart of heater control in the third embodiment of the invention.

FIGS. 20(a) and (b) show ON/OFF timings of the main and sub heaters 2, 3 in the intermittent driving, respectively. FIGS. 20 (c) and (d) show ON/OFF timings of the main and sub heaters 2, 3 in the normal driving, respectively. Further, FIGS. 20(e) and (f) show an ON/OFF timing of the switching signal actually applied to the main and sub switches 5 and 6, which is a combination of the intermittent driving and the normal driving of the main and sub heaters 2.

In the normal driving, when the image forming device is powered on, then the heaters are driven till the fixing roller 1 reaches the temperature preset in the ROM 11. After that, a signal from the temperature sensor 4 is monitored and when the temperature becomes higher than a upper limit value preset in the ROM 11, then the driving of the heaters is terminated. When the temperature becomes lower than a lower limit preset in the ROM 11, then the driving is restarted. This driving timings are as shown in FIGS. 20(c) and (d) and are the same control as explained in the second embodiment. That is, by turning the sub heater on for several milli-seconds just before turning the main heater on, the total amount of change in current is dispersed in time to reduce the instantaneous abrupt change in current of the power supply.

In the intermittent driving, as shown in FIGS. 20(a) and (b), the main heater 2 is intermittently turned on and off at intervals of a predetermined period of time while the sub heater 3 is turned on for a short time immediately before and after, and in adjacent to the ON duration of the main heater 2. However, this intermittent control causes the signals shown in FIGS. 20(a) and (b) to be reflected on the switching elements 5 and 6 only when there is no control signal issued depending on the fixing roller's temperature, i.e., when the signals of FIGS. 20(c) and (d) are both in OFF. Thus, the ON/OFF timings for the switching elements 5 and 6 are controlled as shown in FIGS. 20(e) and (f). In the present embodiment, the ON duration of the main heater 2 of FIG. 20(a) is, for example, 100 to 200 milli-seconds and that of the sub heater 3 of FIG. 20(b) is, for example, approximately 60 milliseconds. Such control allows the heaters to intermittently conduct even when the control signal depending upon the fixing roller's temperature is off, preventing the heater resistance from being lowered. This results in the reduction of the rush current at the start of the normal driving.

The ON and OFF durations of the main and sub heaters 2 and 3 of FIGS. 20(a) and (b) are not to be such values that raise the fixing roller's temperature due to the intermittent driving. Employing the intermittent driving makes the fixing roller's temperature be lowered slower as compared to the case without it.

Usually, the main and sub heaters are disposed in the cavity of the fixing roller 1, and their filaments and the fixing roller are different in specific heat and thermal capacity, and hence, the roller and filament temperatures do not necessarily agree with each other. Therefore, even when the fixing roller's temperature falls below the lower limit at which the normal driving is initiated, the filament temperature remains at a certain level, avoiding the decrease in their resistance.

Figure 21:
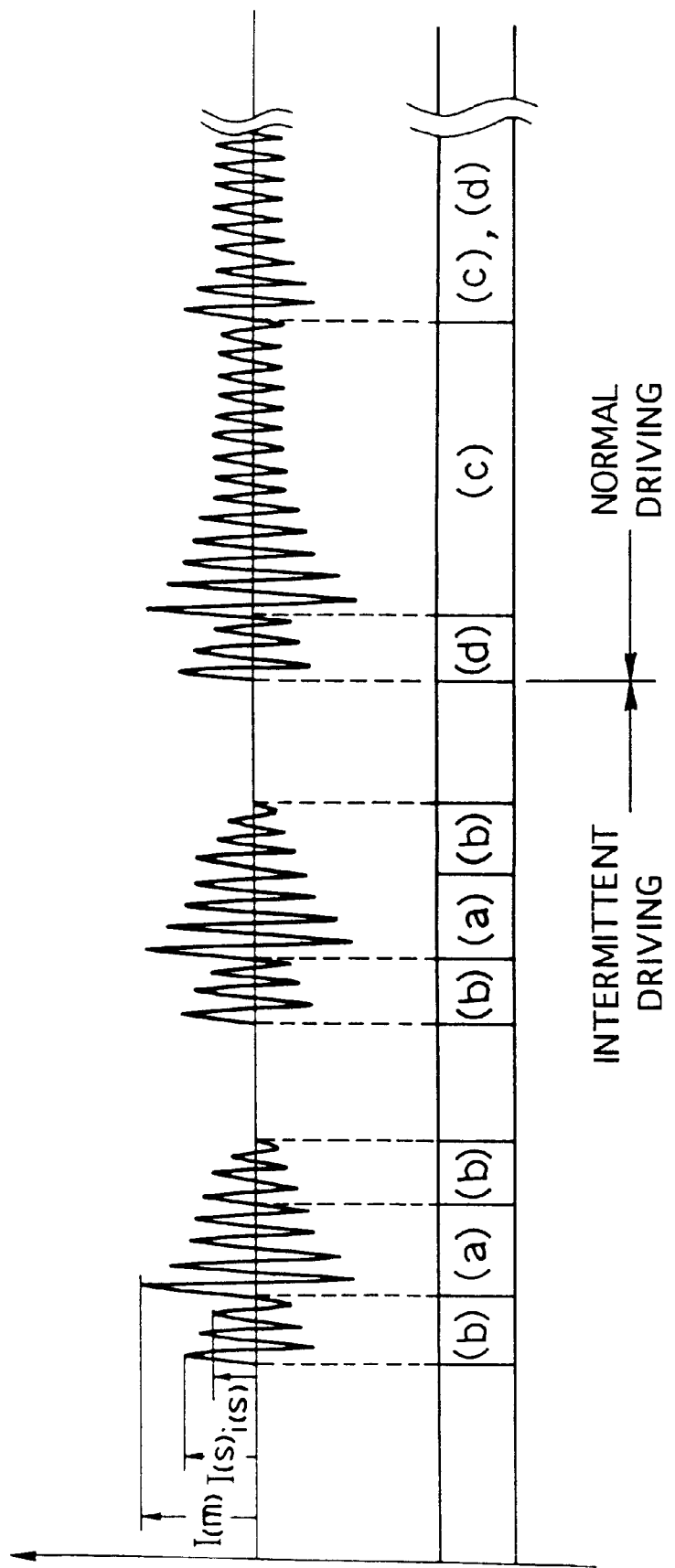
FIG. 21 is a diagram showing a current waveform appearing in a power supply in the third embodiment of the invention.

FIG. 21 shows the waveform of a current flowing in the power supply 7 in the third embodiment. With reference to this FIG., the reduction in current change will be explained.

The timing chart below the waveform in FIG. 21 shows which control signals of FIGS. 20(a)–(f) forms that part of the current waveform. Since the main and sub heaters 2 and 3 are independent of each other, a current of I(m) flows at the moment the main heater 2 is turned on in the intermittent driving, as shown in FIG. 21. That is, if the main heater 2 alone is turned on, the current of I(m) would flow instantaneously. Also, as shown in FIG. 21, a current of I(s) flows at the moment the sub heater 3 is turned on. However, since the sub heater 3 has a smaller power consumption, the current I(s) is of no problem. Now assume that the sub heater's current is i(s) that flows several 10 milli-seconds after the sub heater 3's turning-on. At this moment, the sub heater 3 is turned off, and at the same time the main heater 2 is turned on, resulting in the change in current being I(m)−i(s). Thus, the instantaneous change in current flowing the power supply is reduced. This third embodiment has no resistor 13, and hence, it is assumed that the I(m) in FIG. 21 is greater than that in FIG. 18. However, the effect of reducing the amount of current change due to the difference between the two currents is still available in the third embodiment.

In addition, the main heater's ON duration in the intermittent driving is short and the heater is not fully warmed up. Therefore, the current value of the main heater 2 at the moment the main heater is turned off in the intermittent driving is greater than that of the normal current in the normal driving, and hence, the amount of instantaneous change in current is not negligible. Then, as an analogous concept, the sub heater 3 is turned on at the same time the main heater 2 is turned off, to thereby provide smooth current change as shown in FIG. 21. Since the sub heater 3 has a smaller power consumption than the main heater 2, the current change at the sub heater's turning-off is smaller.

As described above, by reducing the instantaneous current change, flickers of the light and noises are prevented from occurring.

Figure 22:
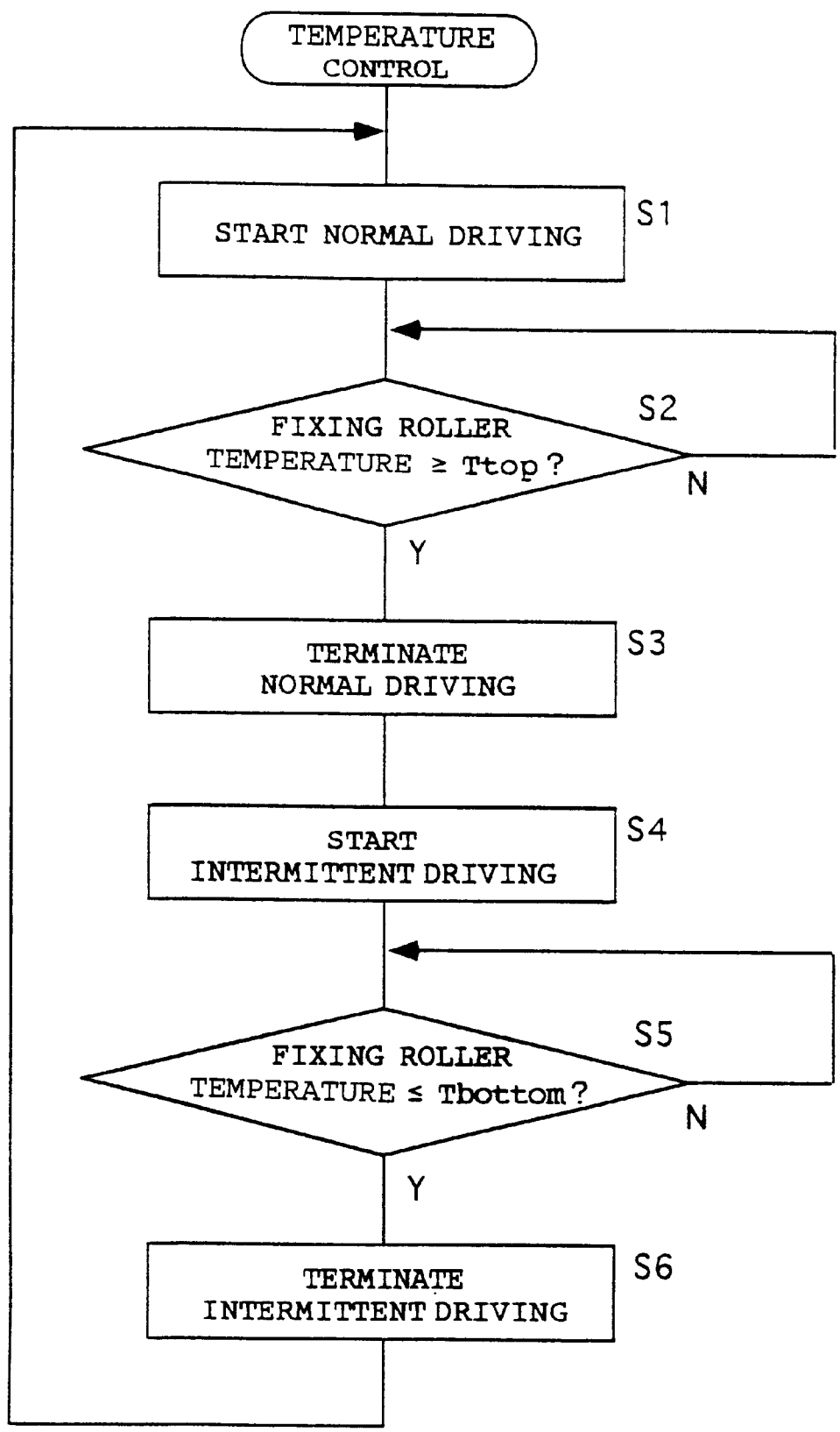
FIG. 22 is a flowchart showing control of a heater temperature in the third embodiment of the invention.

Referring next to FIG. 22, there is shown a flowchart of a temperature control for the fixing roller 1 in the third embodiment.

Firstly, when the power of the image forming device is turned on, the normal driving is started (S1). As described previously, the normal driving is performed for driving the main and sub heaters 2 and 3 based on the timings shown in FIGS. 20(c) and (d).

The temperature on the fixing roller surface is monitored all the time by the temperature sensor 4 (S2), such that the normal driving is continued until the temperature reaches a value Ttop which is preset in the ROM 11 (S1). When the fixing-roller surface temperature reaches Ttop, the normal driving is terminated (S3) and the intermittent driving is started (S4). In the intermittent driving, as described above, the main and sub heaters 2 and 3 are driven according to the timings of FIGS. 20(a) and (b). During the intermittent driving, the fixing-roller surface temperature lowers gradually. This decrease in temperature of the fixing roller 1 is monitored by the temperature sensor 4 to be compared with a lower limit value Tbottom of temperature which is preset in the ROM 11 (S5). When the fixing-roller surface temperature has lowered than Tbottom, then the intermittent driving is terminated (S6) and the normal driving is re-started (S1).

While the preferred embodiment of the present invention have been described, it is possible to change and modify them without departing from the scope of the invention. For example, the intermittent driving control explained with the this embodiment may be applied to the image forming device which includes the rush current prevention means (resistor, phase control, power thermistor, wave number control, etc.) explained with the second embodiment, which will result in further more advantages in the reduction of flickers and noises. Although it is described that the sub heater was turned on before and after the main heater's ON period in the intermittent driving, the sub heater may be turned on only before that, which can still provide the main effect.

Further, although an example of using two heaters of the main and sub heaters has been explained as the fixing roller 1, it may include a single heater together with an element existing in the image forming device, e.g., an optical lamp or an environment heater (both not shown) used instead of the sub heater 3 in the circuit shown in FIG. 16 or 19. The optical lamp or the environment heater in this case is not intended to generate heat for the fixing but only for controlling the current flow in the power supply. The driving of the optical lamp for a short time of several 10 milli-seconds will not be perceptible to the human eye, thus providing no problem. In the case of using the environment heater, a plurality of such heaters may be used in series with each other so as to provide a desired power consumption.

In the circuit shown in FIG. 16, a dedicated element used as the resistor 13 may also be replaced by an existing element (e.g., environment heater) in the image forming device.

According to the second and third embodiments as described hereinbefore, by turning on the sub heater of a small power consumption for a short time immediately before the main heater of a greater power consumption is turned on, an instantaneous current change is lowered to reduce the flickers caused in the light or the like.

Also, even when the rush current prevention means, such as a resistor, is used, the resistor is not necessary for the sub heater because of its low power consumption, but necessary only for the main heater.

In addition, since the current change is reduced by the sub heater's turning-on for a short time prior to the main heater's turning-on, the requirement of reducing the rush current by the resistor may be relieved to a certain extent. As a result, it is allowed to use a resistor of a lower resistance, which leads to the reduction in power consumption of the resistor while making the resistor compact and improving the security.

INDUSTRIAL APPLICABILITY

The present invention is applicable to design and manufacture of image forming devices such as electrostatic copying machines, printers, etc. to reduce flickers of the light and noises that will adversely affect other electronic devices.

What is claimed is:

1. A method of driving fixing heaters including first and second heaters, the method comprising the steps of:
    employing control of thinning one or more of half-waves from among each cycle of at least consecutive three half-waves of applied AC power voltage;
    providing, immediately after the AC power voltage is started to be applied to the fixing heaters, a first period in which only the first heater is driven, and a second period following the first period in which only the second heater is driven;
    the first and second heaters being thinning-controlled in the first and second periods, respectively.

2. The method according to claim 1, wherein in the first and second periods, the thinning control is performed such that plural cycles of half-waves are applied to each of the first and second heaters while the number of half-waves thinned is changed from a large value to a small one.

3. The method according to claim 1, wherein in the first and second periods, the thinning-control is performed at a cycle of three half-waves so as to apply plural cycles of half-waves to each of the first and second heaters, with the number of half-waves thinned being "2".

4. The method according to claim 3, wherein in the first and second periods, after the application of the plural cycles of half-waves with the number of half-waves thinned being "2", another plural cycles of half-waves are applied to each of the first and second heaters, with the number of half-waves thinned being "1".

5. The method according to claim 1, further comprising the step of:
    providing a third period following the second period in which the first and second heaters are driven; and
    in at least one of the first and second sub periods the first and second heaters being thinning-controlled and the relation of the thinning controls of the two heaters being such that they are complementary to each other on the time axis.

6. The method according to claim 5, wherein in the third period, at a cycle of consecutive three half-waves, the first heater is driven by thinning one or two half-waves from the three half-waves of one cycle, while the second heater is driven only with the half-waves that are thinned with respect to the first heater.

7. The method according to claim 5, wherein in the third period, an alternate switching is made between a first driving pattern applied to the first and second heaters and a second driving pattern in which the relation between the first and second heaters are reversed compared to the first driving pattern.

8. The method according to claim 5, wherein the following control is performed at a cycle of three consecutive half-waves, which is substantially equal to the control in which Nm consecutive half-waves to the first heater and Ns consecutive half-waves to the second heater are alternately and repeatedly applied;
    (a) in a case where 2Nm>Ns and 2Ns>Nm:
        in the first sub period of the third period, the first and second heaters are driven by 2Ns-Nm half-waves with the first driving pattern in which two half-waves are thinned from a cycle of three half-waves for the first heater while the second heater is driven with the two half-waves that are thinned for the first heater; and
        in the second sub period, the first and second heaters are driven by 2Nm-Ns half-waves with the second driving pattern in which one half-wave is thinned from a cycle of three half-waves for the first heater while the second heater is driven with the one half-wave that is thinned for the first heater;
    (b) in a case where 2Nm≦Ns:
        in the first sub period, the first and second heaters are driven by 3Nm half-waves with the first driving pattern; and
        in the second sub period, instead of the second driving pattern, only the second heater is driven by Ns-2Nm half-waves with no half-waves thinned; and
    (c) in a case where 2Ns≦Nm:
        in the first sub period, the first and second heaters are driven by 3Ns half-waves with the second driving pattern; and
        in the second sub period, instead of the second driving pattern, only the first heater is driven by Nm-2Ns half-waves with no half-waves thinned.

9. An image forming device having a fixing unit for fixing a toner image on a sheet, said image forming device comprising:
    first and second heaters as fixing heaters for the fixing unit;
    first and second switching means for independently controlling applications of AC power voltage to the first and second heaters;
    a temperature sensor means for detecting a heater temperature of the fixing heaters;
    a zero-cross detection means for detecting zero-cross points of the AC power voltage; and
    a control means for deciding based on a predetermined procedure, when the temperature detected by the temperature sensor means is lower than a predetermined value, whether or not the first or second heater is to be driven with a half-wave of the power voltage each time a zero-cross point is detected by the zero-cross detection means, and for controlling the first and second switching means on the basis of the decided result;
    said control means employing control of thinning one or more of half-waves from among each cycle of at least consecutive three half-waves of applied AC power voltage;
    providing, immediately after the AC power voltage is started to be applied to the fixing heaters, a first period in which only the first heater is driven, and a second period following the first period in which only the second heater is driven, and a third period following the second period in which the first and second heaters are driven;

the first and second heaters being thinning-controlled in the first and second periods, respectively;

the third period being divided into first and second sub periods which are alternately repeated; and in at least one of the first and second sub periods the first and second heaters being thinning-controlled and the relation of the thinning controls of the two heaters being such that they are complementary to each other on the time axis.

10. The image forming device according to claim 9, wherein the first and second heaters preferably have different distributions in thermal intensity.

11. An image forming device, comprising:

a fixing roller including a first heater and a second heater of a power consumption lower than the first heater;

first and second switching means for independently controlling the first and second heaters;

a temperature sensor means for detecting a temperature of the fixing roller; and a control means for controlling the first and second switching means so as to drive the first and second heaters when the temperature of the fixing roller detected by the temperature sensor means is lower than a predetermined lower limit;

said control means controlling the first and second switching means such that, when the fixing roller temperature has become lower than the predetermined lower limit, the second heater is first turned on and then immediately turned off, and that at the same time with the turning-off of the second heater the first heater is turned on, and then after a predetermined time elapsed the second heater is re-turned on.

12. The image forming device according to claim 10, wherein said control means preferably controls the first and second switching means such that when the temperature of the fixing roller reaches a predetermined upper limit the first heater is first turned off, and then, after a certain time, the second heater is turned off.

13. The image forming device according to claim 11, further comprising a rush current preventing means for reducing the magnitude of a rush current that occurs at the time of the first heater's turning-on, the control means normally enabling the rush current preventing means while disabling the same after the first heater is turned on when the fixing roller temperature has become lower than the predetermined lower limit, from a predetermined time prior to the second heater's re-turning-on at least till the first heater's turning off.

14. The image forming device according to claim 13, wherein said rush current preventing means includes a resistor which is selectively connected in series with the first heater and a third switching means for inserting/removing the resistor in series with the first heater;

said control means controls the third switching means such that the resistor is normally inserted in series with the first heater and the resistor is removed after the first heater is turned on when the fixing roller temperature becomes lower than the predetermined lower limit, from a predetermined time prior to the second heater's re-turning-on at least till the first heater's turning-off.

15. The image forming device according to claim 14, wherein instead of the resistor, an optical lamp or an environmental heater existing in the image forming device is used as the resistor.

16. The image forming device according to claim 11, wherein instead of the second heater, an optical lamp or an environmental heater existing in the image forming device is used as the second heater.

* * * * *